United States Patent [19]

Washburn et al.

[11] Patent Number: 5,033,567
[45] Date of Patent: Jul. 23, 1991

[54] LOW PROFILE SELF PROPELLED VEHICLE AND METHOD FOR CONVERTING A NORMAL PROFILE VEHICLE TO THE SAME

[75] Inventors: David J. Washburn, 194 E. 1200 South, Orem, Utah 84058; Glenn L. Enke, Orem, Utah

[73] Assignee: David J. Washburn, Orem, Utah

[21] Appl. No.: 448,807

[22] Filed: Dec. 11, 1989

[51] Int. Cl.⁵ .................. B62D 33/06; B62D 49/00
[52] U.S. Cl. ...................... 180/89.12; 280/787; 296/183; 296/193
[58] Field of Search .............. 180/89.12, 89.1; 280/787, 785, 790; 296/183, 193, 194, 195, 196, 197

[56] References Cited

U.S. PATENT DOCUMENTS

| | | | |
|---|---|---|---|
| 2,897,004 | 7/1959 | Skeens | 298/25 |
| 3,675,966 | 7/1972 | Luft | 296/190 |
| 3,680,653 | 8/1972 | Murata et al. | 280/89.1 |
| 3,698,759 | 10/1972 | Luft | 296/35.1 |
| 3,885,643 | 5/1975 | Goodbary | 180/89.13 |
| 4,078,629 | 3/1978 | Kutay et al. | 180/89.13 |
| 4,090,736 | 5/1978 | Finney | 299/30 |
| 4,157,878 | 6/1979 | Jamison | 405/303 |
| 4,415,051 | 11/1983 | Taylor | 180/65.1 |

OTHER PUBLICATIONS

Marketing Brochure for the EIMCO 955 Minetender Carrier, EIMCO Mining Machinery International.
Marketing Brochure for A. L. Lee Corp. Model 1112-4D Personnel Transporter.
Marketing Brochure of Getman Corp. A64 Series Personnel Carrier.
Potential Public Use by Mountain Pacific Transport of Pleasant Grove, Utah (as evidenced by photographs 1-6).

Primary Examiner—Kenneth R. Rice
Attorney, Agent, or Firm—Thorpe, North & Western

[57] ABSTRACT

A novel low profile vehicle, and a novel method for converting normal profile vehicles into the same, is disclosed. The low profile vehicle disclosed herein is adapted for use in a variety of applications, such as mining operations and aircraft maintenance applications. Selected components and assemblies found in a normal profile vehicle are removed from the normal profile vehicle's original frame and retained and/or modified for use in a completed low profile vehicle in accordance with the present invention. The operator's cab of the original normal profile vehicle is modified for use in the completed low profile vehicle. A frame extension is added to the forward end of the frame of the normal profile vehicle to form a split level frame in a position forward of the front wheels. The cab is shortened and otherwise modified and attached to the frame extension. The lower level of the frame extension allows the shortened cab to be secured to the frame extension and still not exceed the maximum height allowed for the low profile vehicle. The described low profile vehicle provides many features and better performance than previously available in low profile vehicles and achieves such performance and features more economically than possible with prior art low profile vehicles.

76 Claims, 14 Drawing Sheets

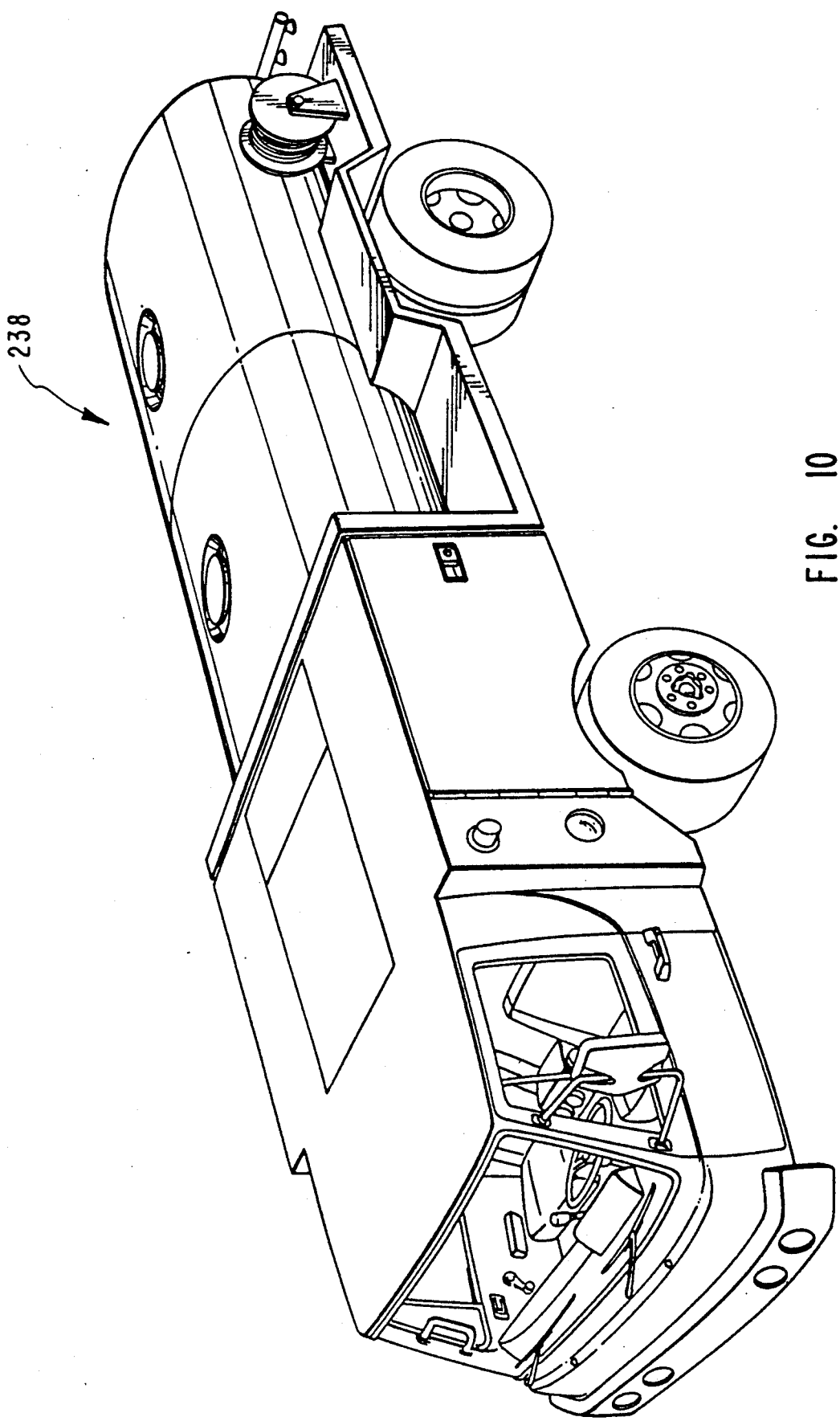

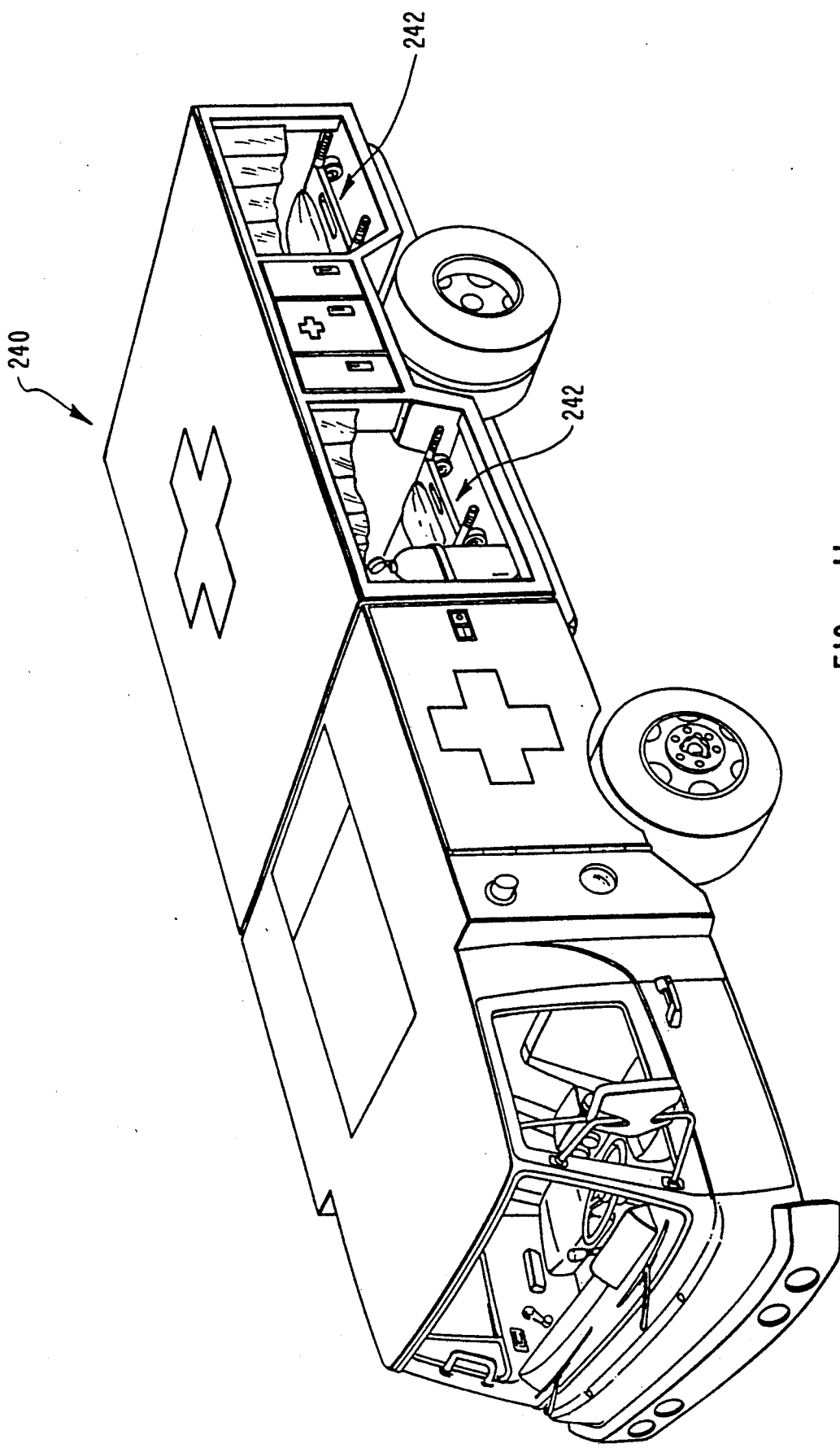

LOW PROFILE SELF PROPELLED VEHICLE AND METHOD FOR CONVERTING A NORMAL PROFILE VEHICLE TO THE SAME

BACKGROUND

1. The Field of the Invention

This invention relates to self propelled vehicles used to transport articles and personnel in locations where the vertical clearance is limited, such as in below ground mining and aircraft support operations. More particularly, the present invention relates to methods of converting normal profile vehicles to low profile self propelled vehicles and the resulting vehicles.

2. The Prior Art

Several modern industries have a need for self propelled low profile vehicles. Examples of such industries are the mining and aircraft maintenance and support industries. For example, both military and commercial aircraft require ground support vehicles which are capable of maneuvering under aircraft wings and fuselages. In the mining industry, vehicles are required to maneuver in low clearance mine roadways to transport personnel, maintenance equipment, fuel and lubricates, and other items from one location to another in the mining operation.

Low profile vehicles are generally defined as those having a maximum vertical height of eighty, and usually less than about sixty, inches or less. The vertical height of a vehicle is generally measured from the underlying road or ground surface to the highest rigid structure on the vehicle.

Not only must a low profile vehicle be able to pass under low clearances, but it must also carry payloads of anywhere in the range from hundreds to thousands of pounds reliably over rough road conditions. Thus, a low profile vehicle should be as thoroughly engineered and tested as normal profile vehicles which are mass produced by the tens of thousands.

Moreover, normal profile vehicles which are intended for use on city streets and highways are generally built so that the operator's cab is raised to the highest practical vertical height to improve visibility of the surrounding traffic from the operator's cab. Normal profile vehicles, such as those which are intended to be operated on city streets and highways generally have a vertical height in the range from eighty to one-hundred and twenty inches. Thus, it is widely recognized among those having skill in the art that normal profile vehicles do not have application in industries requiring low profile vehicles.

The general recognition in the pertinent industries that low profile vehicles are a necessity under certain conditions has caused some manufacturers to produce specialized low profile vehicles. It is the usual case that specific industries, profile vehicles are custom built for specific industries, e.g., vehicles are designed and built individually, or in quantities only in the tens, specifically for the mining or for the aircraft support industries. This is in contrast to the tens, or hundreds, of thousands of a particular chassis of a normal profile vehicle which will customarily be produced by a manufacturer.

Manufacturers of such specialized low profile vehicles include Eimco Mining Machinery International of Canada; A. L. Lee Corp. of Lester, W.V.; and Getman Corporation of Bangor, Mich.

The market for such specifically designed and custom built low profile vehicles is very limited with some manufacturers producing only a few of each model of low profile vehicle each year. Thus, each low profile vehicle is generally built on an individual basis, or in very few numbers, to fill the need of a particular customer or class of customers.

It is widely acknowledged that producing such small numbers of specifically designed low profile vehicles is inherently inefficient. Thus, the cost of each low profile vehicle is very high compared to vehicles which are mass produced and directed to a larger number of users.

Moreover, since so few low profile vehicles are built by each manufacturer, the design and fabrication of the vehicles requires that simple and readily available components, material, and fabrication techniques be used. For example, in mass produced vehicles where tens of thousands are manufactured, such as normal profile trucks, the frame, engine, drive train components, and body parts are all specifically designed and extensively tested to ensure that they work together properly and in a trouble free manner.

In contrast, low profile vehicles are designed by each manufacturer and built in small numbers from the "ground up" with no other perspective in mind but to produce the vehicle for the intended specific end use. Thus, low profile vehicle manufacturers are left to obtain components such as engines, drive trains, and brake systems from other sources where they are mass produced. The remaining components used in low profile vehicles, such as frames and body parts, must be individually fabricated by the vehicle manufacturer.

As recognized in the arts devoted to design and production of normal profile vehicles, the compatibility of vehicle components is crucial to making a vehicle perform most efficiently. Ensuring that vehicle components are compatible requires a great deal of design, engineering, and testing effort before production of the vehicle begins. Such extensive design, engineering, and testing efforts are prohibitively expensive in view of the small numbers of low profile vehicles which are manufactured. Unfortunately, the use of "high quality" and individual components does not ensure that the components will work well together.

Since the frames, bodies, and other components of prior art low profile vehicles must be designed and fabricated in small numbers, they are of simple construction and are fitted with components which are not ideally suited for use therewith. In the case of body parts, large flat pieces of sheet metal are generally attached to a simple geometric framework giving the completed low profile vehicle a "boxy" and "unfinished" appearance when compared to mass produced normal profile vehicles.

Moreover, the fact that each prior art low profile vehicle is individually designed and built causes most manufacturers to omit the design, fabrication and installation of many desirable features into their low profile vehicles. Such omitted features may include performance enhancing features such as drive train, exhaust system, and suspension, braking, and fuel system improvements.

Also omitted from prior art low profile vehicles are even basic amenities for the comfort and safety of the low profile vehicle operator such as cab environmental control, roll down windows, padded dashboard, windshield wipers, and windshield washers. In some cases, low profile vehicles do not provide the operator with any enclosed cab at all.

Further drawbacks which are evident with some prior art low profile vehicles is that the driver and steering wheel are offset from the longitudinal axis of the vehicle, in some cases by as much as 90°. Thus, the low profile vehicle operator must sit and steer sideways. Still further, some manufacturers of low profile vehicles utilize a two piece articulated frame scheme which increases the cost of producing and maintaining the low profile vehicle.

Still another drawback inherent in prior art low profile vehicles is the fact that a new chassis is generally designed for each application. For example, a two person transport, a twelve person transport, and a large two ton equipment transport would each be designed from the ground up using all different components. Disadvantageously, this scheme also requires that an owner of such vehicles maintain a different complete parts inventory and trained repair technicians for each of the different vehicles.

In view of the foregoing, it would be an advance in the art to provide a low profile vehicle which includes the desirable features present in normal profile vehicles while providing the low profile vehicle at a lower cost than prior art low profile vehicles. It would be a further advance in the art to provide a method of converting normal profile vehicles for use as low profile vehicles. It would also be an advance in the art to provide a low profile vehicle conversion which allows low profile vehicles to be produced more efficiently than are prior art low profile vehicles which are designed and built in small numbers for specific end uses.

BRIEF SUMMARY AND OBJECTS OF THE INVENTION

The present invention provides a novel low profile vehicle for use in a variety of applications, such as mining applications. The present invention also provides a novel method for converting a normal profile vehicle into a low profile vehicle. The present invention results in a low profile vehicle which costs less to fabricate and operates more efficiently than prior art low profile vehicles.

In accordance with the present invention, selected components and assemblies found in a normal profile vehicle's original frame are retained and/or modified for use in a completed low profile vehicle in accordance with the present invention. Such components and assemblies include features heretofore unavailable in low profile vehicles.

In particular, while carrying out the method of the present invention, the operator's cab of the original normal profile vehicle is removed and the control lines between the cab and various vehicle components are disconnected. To the forward end of the frame of the normal profile vehicle is added a frame extension to form a split level frame of the present invention.

The present invention incorporates a split level rigid frame utilizing much of the ladder-type frame of the normal profile vehicle chassis. The split level frame is fabricated by attaching a frame extension to the existing ladder-type frame of the normal profile vehicle in a position forward of the front wheels.

The frame extension provides a lower frame surface than the remaining frame of the original normal profile vehicle. The higher rearward portion of the frame supports a power train, other operating components, and a body of some type.

A section of the cab which was removed from the original normal profile chassis is modified and attached to the frame extension. The lower level of the frame extension allows the modified cab to be secured to the frame extension and not exceed the maximum height allowed for the low profile vehicle. The control lines are also reconnected to provide control functions to the operator's cab.

Retaining and reusing, in modified form, the operator's cab allows the desirable features found therein to be incorporated into a low profile vehicle at a much lower cost than possible with prior art low profile vehicles which are uniquely designed for particular end uses. Furthermore, the components originally included in the normal profile vehicle chassis operate together much more efficiently than components which are often included in prior art low profile vehicles.

Moreover, the original normal profile vehicle includes many advantageous features and components which are not included in the completed low profile vehicle of the present invention. Still further, the extensive engineering and testing which is invested in a mass produced normal profile vehicle results in a more reliable and efficient low profile vehicle after the conversion of the present invention.

In view of the forgoing, it is a primary object of the present invention to provide a method for converting a normal profile vehicle into a low profile vehicle which can be adapted for use in a variety of applications requiring a low profile vehicle.

It is another object of the present invention to provide a method for converting a normal profile vehicle into a low profile vehicle which may be carried out more efficiently and more economically than fabricating a low profile vehicle in accordance with the teachings of the prior art.

It is another object of the present invention to provide a method of converting a normal profile vehicle into a low profile vehicle which retains the desirable features of the normal profile vehicle.

It is yet another object of the present invention to provide a low profile vehicle adapted for maneuvering below ground on mining roadways which includes features not previously available in low profile vehicles.

It is a still further object of the present invention to provide a method of converting a normal profile vehicle into a low profile vehicle wherein the operator's cab of the normal profile vehicle is retained and modified for use in the low profile vehicle.

It is another object of the present invention to provide a low profile vehicle which utilizes a common chassis which is capable of supporting several bodies and which requires only a single repair parts inventory.

These and other objects of the present invention will become more fully apparent during an examination of this disclosure and by practicing the invention.

BRIEF DESCRIPTION OF THE DRAWINGS

FIG. 10 is a perspective view of another low profile vehicle of the present invention with a fresh water/waste water tank body installed thereon.

FIG. 11 is a perspective view of another low profile vehicle of the present invention with a medical assistance and transport body installed thereon.

DETAILED DESCRIPTION OF THE PREFERRED EMBODIMENT

Reference will now be made to the drawings wherein like structures will be provided with like reference designations. A general overview of the presently preferred embodiment of the present invention will first be provided followed by a detailed listing of the presently preferred steps used to carry out the method of the present invention.

1. General Overview of the Method and Structure of the Present Invention

There are instances in various industries where efficient operations within the industry requires a vehicle which can maneuver under low clearances. In this disclosure a low profile vehicle will be described which is intended for use in mining operations. The present invention, and also the particular embodiment described herein, has applications and uses other than in mining operations.

Figure 1:
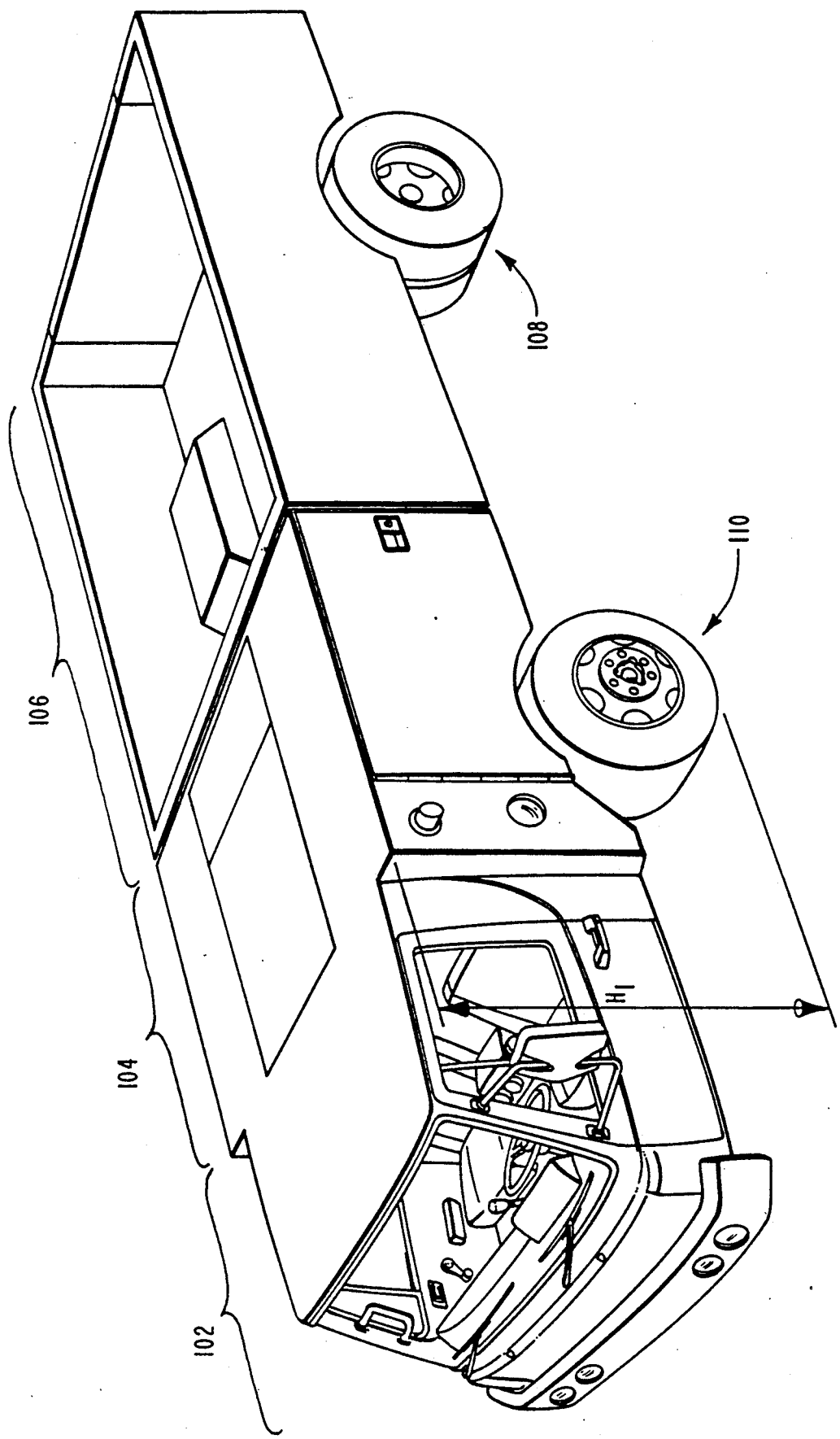
FIG. 1 is a perspective view of a completed low profile vehicle which was converted from a normal profile vehicle in accordance with the present invention.

FIG. 1 provides a perspective view of one presently preferred embodiment of the present invention which results from the method of the present invention being carried out on a normal profile vehicle chassis which was mass produced for use on city streets and highways. It will be appreciated that a low profile vehicle used in mining operations must be able to maneuver in low clearances, for example, less than fifty-five inches. Normal profile vehicles intended for city and highway use place the operator's cab as high as practically possible, for example eighty to one-hundred and twenty-five inches vertical height, in order to maximize the visibility of the operator.

The embodiment of the present invention is specifically intended to be used as a two man general utility low profile truck in mining operations which will maneuver on low clearance mining roadways. In general, a low profile vehicle is defined as a vehicle having a maximum height of less than eighty inches.

The clearances available from one below ground mining operation to another varies considerably. In one mine clearances of one-hundred inches or more may be available. In another mine, the clearance may only be fifty-five inches or less. In many cases, reducing the maximum height of a low profile vehicle by merely several inches is important.

The preferred maximum height of the embodiment is fifty-five inches, as represented in FIG. 1 at H1, but higher or lower maximum heights may be utilized according to the teachings of the present invention and the requirements of the particular application. A maximum height of fifty-five inches allows the low profile vehicle to maneuver in the great majority of below ground mining operations and in aircraft support applications.

The embodiment of the present invention illustrated in FIG. 1 includes a cab assembly, designated by bracket 102, an engine assembly, designated by bracket 104, and a body assembly, designated by bracket 106.

The body assembly represented in FIG. 1 is a general purpose truck bed which may be exchanged for other body assemblies adapted for other purposes as will be explained in detail later in this disclosure. Also illustrated in FIG. 1 is one of a pair of dual rear wheels, generally designated at 108, and one of a pair of front wheels, generally designated at 110, which are used to steer the vehicle.

The present invention's method of converting a normal profile vehicle to a low profile vehicle may be carried out on any number of mass produced normal profile vehicles which are commercially available. Such normal profile vehicles preferably include general purpose truck chassis (including engine, drive train, suspension, and wheels) or more specialized normal profile vehicles. It will also be appreciated that it is within the scope of the present invention to obtain the various chassis components as assemblies and then to produce a low profile vehicle within the scope of the present invention from the assemblies.

Figure 2:
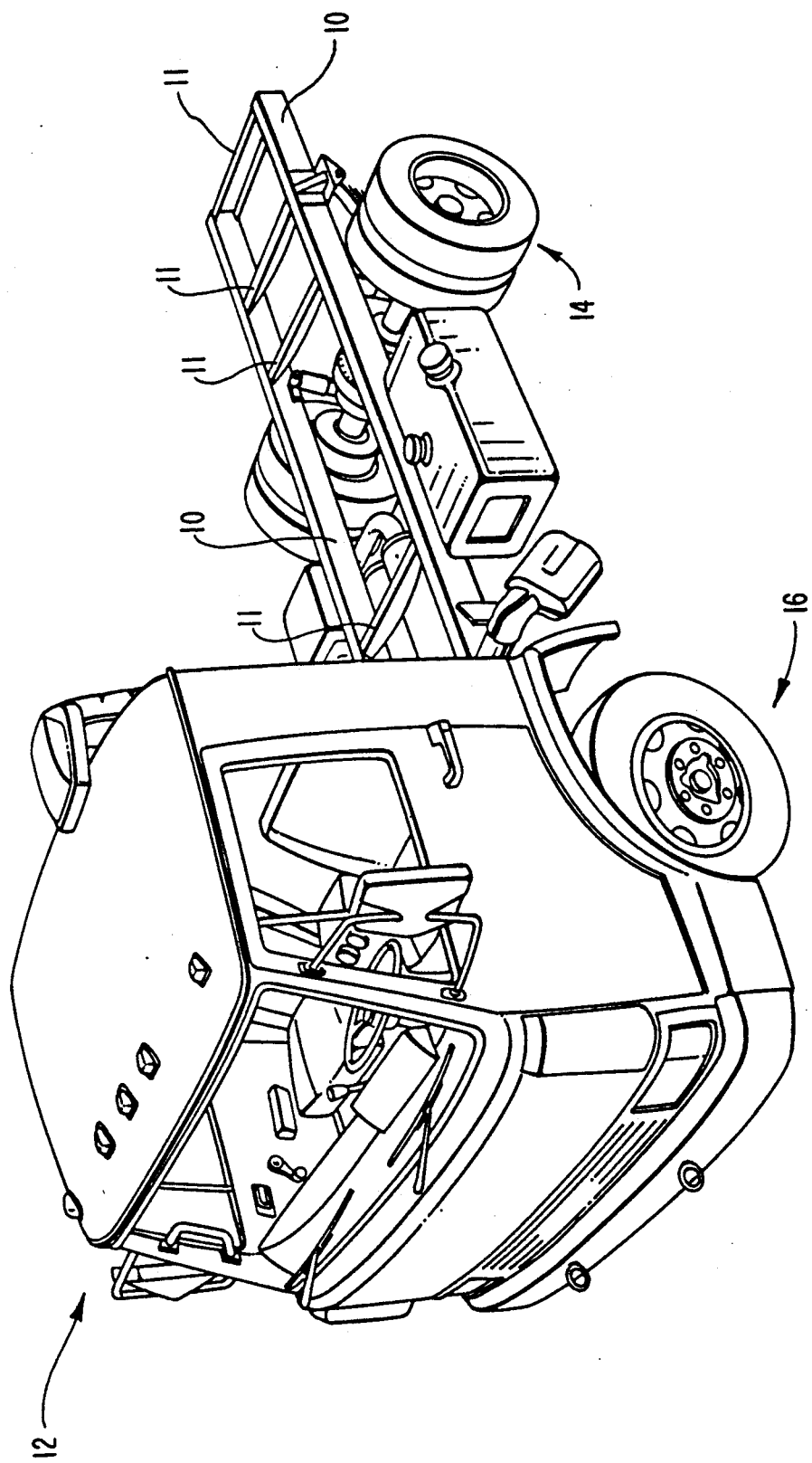
FIG. 2 is a perspective view of a normal profile vehicle chassis suitable for being converted to a low profile vehicle in accordance with the present invention.

Illustrated in FIG. 2 is a perspective view of a commercially available normal profile vehicle chassis which is presently preferred for use with the present invention. The illustrated chassis represents one of several available from Iveco Trucks of North America, Inc., 4 Sentry Parkway, Blue Bell, Pa. 19422.

The models preferred for use with the present invention which are available from Iveco Trucks of North America, Inc. are those beginning in the model year 1989 and identified by the following model numbers (including commencing serial numbers provided in parentheses): 12-11 (1110000); 12-12 (1150000); 10-14 (1210000); 12-14 (1250000); 15-14 (1310000); 18-14 (1350000); and 23-16 (1410000). Other normal profile vehicle chassis may also be used in accordance with the present invention. Further information concerning the identified models can be obtained from Iveco Trucks and from the version of the publication which is current as of December 1989 and entitled Iveco Diesel Truck Parts Manual (also referred to as Euro Spare Parts Catalog from Model Year 1989) which is incorporated herein by reference.

The vehicle chassis illustrated in FIG. 2 is well suited for carrying out the present invention. The ladder frame of the chassis includes two parallel rails 10 and a plurality of cross members 11. While the preferred vehicle chassis includes two rails as frame members, other chassis having other types of frames may be used.

Represented in FIG. 2, dual rear wheels 14 provide suitable traction for many applications and with the modifications of the present invention, as will be explained shortly, offer excellent performance in applications such as mining operations. Front wheels 16 are used to steer the vehicle.

The components and design of the preferred vehicle chassis provide an efficient low profile vehicle after undergoing the conversion of the present invention. As will be explained in more detail, the engine, suspension, brakes, and other components are, upon modification in accordance with the present invention, well suited to performing in a low profile vehicle and work together much better than the collection of components found in previous low profile vehicles. Moreover, the present invention allows features to be incorporated into a low profile vehicle which are unavailable in prior art low profile vehicles.

For example, a cab 12 is provided on the vehicle chassis illustrated in FIG. 2 which includes many operator safety and comfort features which are expected in normal profile vehicles. Such safety and comfort features are absent in prior art low profile vehicles and are considered, according to the conventional wisdom found in the art, as unavailable in low profile vehicles due to economic or other considerations. Such safety and comfort features included in the embodiment of the present invention will be specifically pointed out later in this disclosure.

Figure 2A:
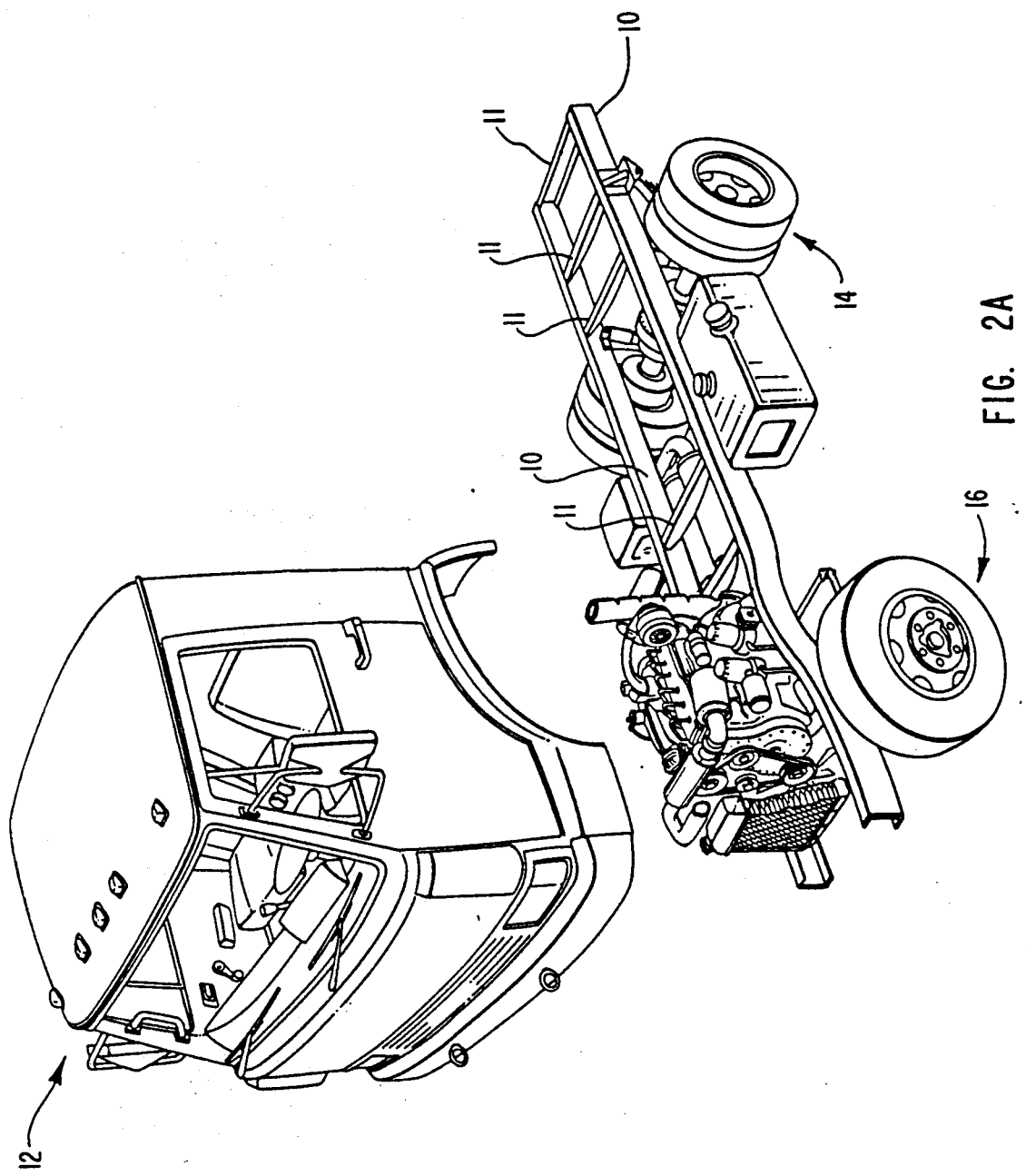
FIG. 2A is a perspective view of the cab assembly of the normal profile vehicle chassis illustrating the step of removing the cab from the frame in accordance with the present invention.

Illustrated in FIG. 2A is the cab 12 of the vehicle chassis illustrated in FIG. 2 as it is being removed from the frame in accordance with the present invention. It will be appreciated that removal of the cab requires the disconnection of a variety of control lines, such as the steering wheel assembly, the accelerator cable, the clutch pedal assembly, the brake pedal assembly, the gear shift link rod, and other various components.

Those having skill in the art will appreciate the items which will require attention during the removal of the cab from the illustrated preferred vehicle chassis or from another vehicle chassis. Detailed information concerning the steps of removing the cab from the frame and the disconnection of control lines and other components from the preferred vehicle chassis will be provided later in this disclosure.

In accordance with the present invention, a split level frame means for supporting the other vehicle components thereon is provided. Represented in FIG. 3 are the components used to construct the presently preferred example of the split level frame means of the present invention.

Figure 3:
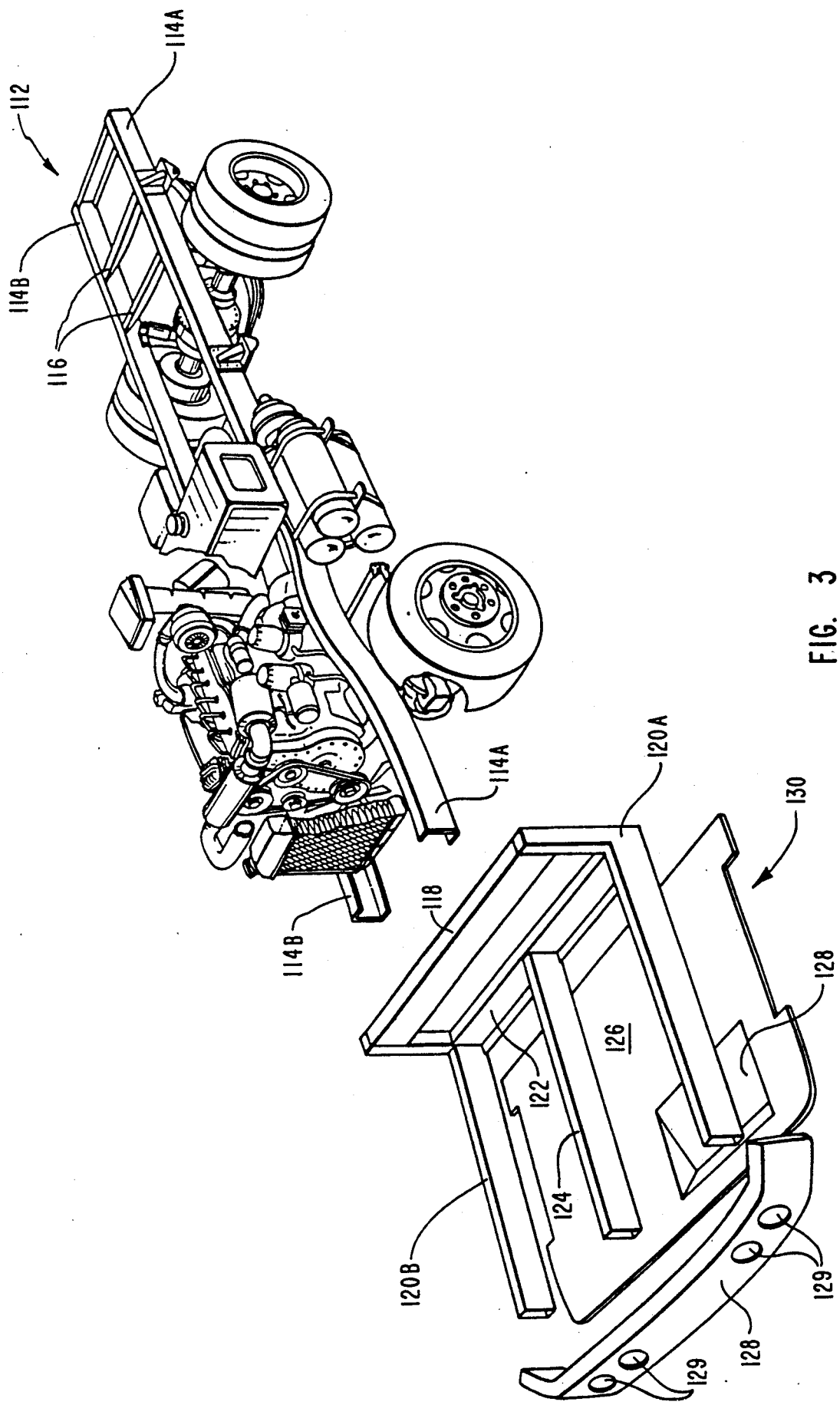
FIG. 3 is a perspective view showing a step of the present invention wherein a frame extension is attached to the frame of the normal profile vehicle.

Illustrated in FIG. 3 is a frame 112 (which before modification comprised rails 10 and cross members 11 as shown in FIG. 2) which includes parallel rails, now indicated at 114A and 114B, and a plurality of cross members indicated at 116. The ladder type frame illustrated in FIG. 3, which functions as a portion of the split level frame means of the present invention, is exemplary of the structures which may serve this function.

A frame extension, generally designated 130, is fabricated and attached to frame rails 114A and 114B to complete the presently preferred example of the split level frame of the present invention. The incorporation of a split level frame allows the operator's cab (not shown in FIG. 3) to take full advantage of the height available between the maximum vertical height and the minimum ground clearance (the distance between the underlying surface and the vehicle components protruding below the level of the original frame. The use of the split level frame allows the cab to have the maximum possible height allowing for operator comfort and efficiency rather than the cramped operator's positions found in the prior art low profile vehicles.

The frame extension 130 comprises a torsion tube 118 which is attached to frame rails 114A and 114B. Two cantilever arms 120A and 120B are attached to torsion tube 118 so that their legs extend in a forward direction. A Z bar 122 is connected crossways between cantilever arms 120A and 120B and a tubular floor support 124 is connected thereto as illustrated in FIG. 3.

Frame extension 130 illustrated in FIG. 3 serves to support the cab which, after modification in accordance with the present invention, will be secured thereon. A floor plate 126 is attached to the bottom of the legs of cantilever arms 120A and 120B and to the bottom of tubular floor support 124 to form a floor.

A recess 128 is provided in floor plate 126 where accelerator, brake, and clutch operation pedals will be installed. To the forward end of frame extension 130 a bumper 128 is attached. Headlight fixtures 129 are also provided in bumper 128.

The illustrated structure provides a strong frame extension which is lower than the remaining portion of the frame to accommodate the height of the cab to be placed thereon as will be explained shortly. From the teachings contained herein, those skilled in the pertinent art will readily understand what materials and techniques are suitable for use in the fabrication of frame extension 130.

Figure 3A:
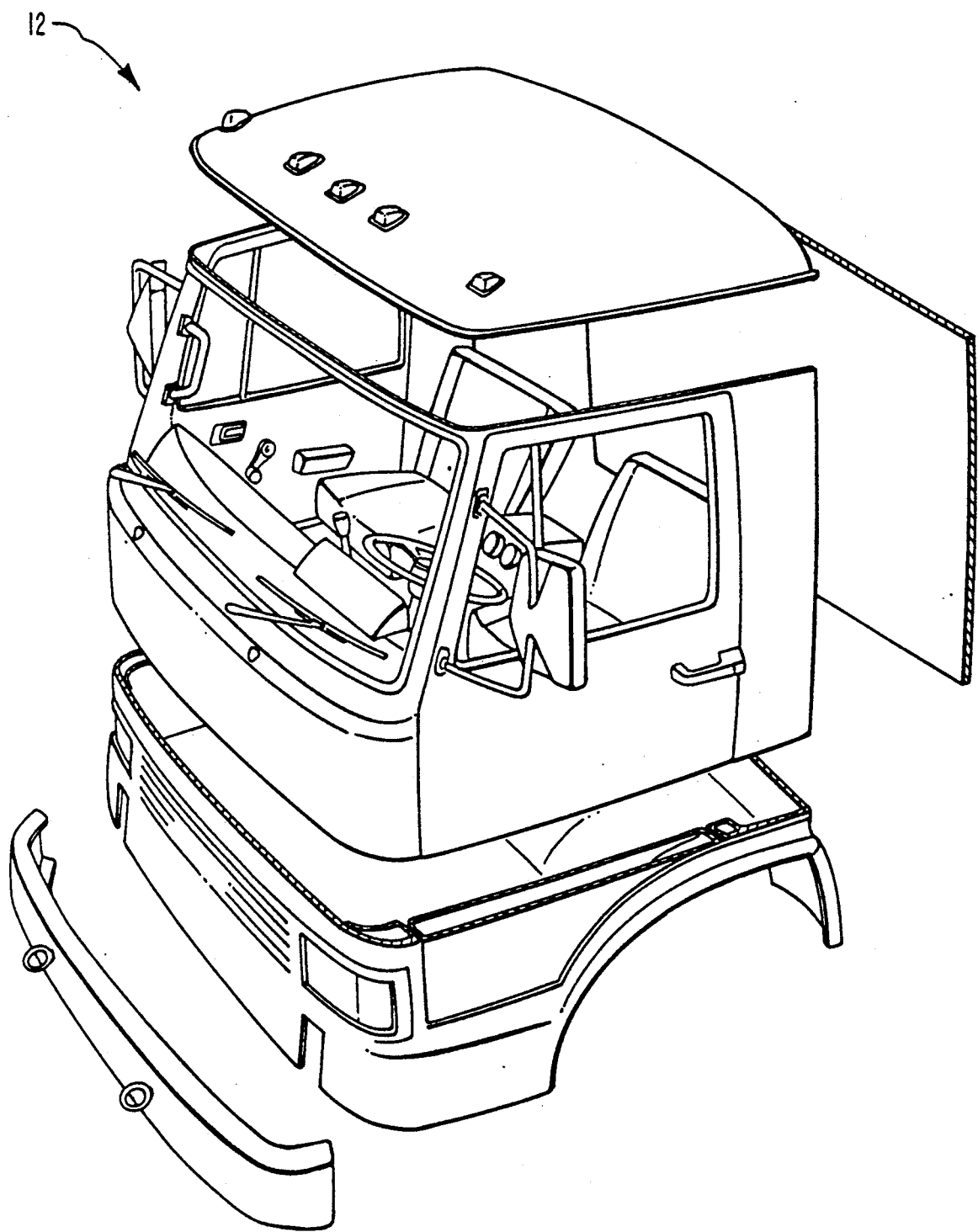
FIG. 3A is a perspective view of the cab assembly of the present invention undergoing the cut down step of the present invention.

Referring next to FIG. 3A, cab 12 of the preferred vehicle chassis is illustrated undergoing the "cut down" step of the present invention. While other cabs may be treated differently than that specifically described herein, the described modification of the cab is the presently preferred in this example of the present invention.

As illustrated in FIG. 3A, the original cab is modified to form the primary component of the cab assembly (102 in FIG. 1) of the described embodiment. In accordance with the present invention, the height of the cab is reduced while still retaining many of its advantageous features.

FIG. 3A shows the approximate cut lines used to shorten the cab. The cab roof is removed and a protective roof plate is installed on the completed cab assembly as shown at 202 in FIG. 4. The original roof is removed just above the drip gutter provided around the roof of the cab.

The side walls and front wall of the cab, as well as the entry doors, are reduced in height, and the back wall is removed, as shown in FIG. 3A. After examining the teachings contained herein, those skilled in the art will appreciate what other arrangements may be used to cut down a cab of a normal profile vehicle in accordance with the present invention to accommodate particular applications and to fit other vehicle chassis.

Figure 4:
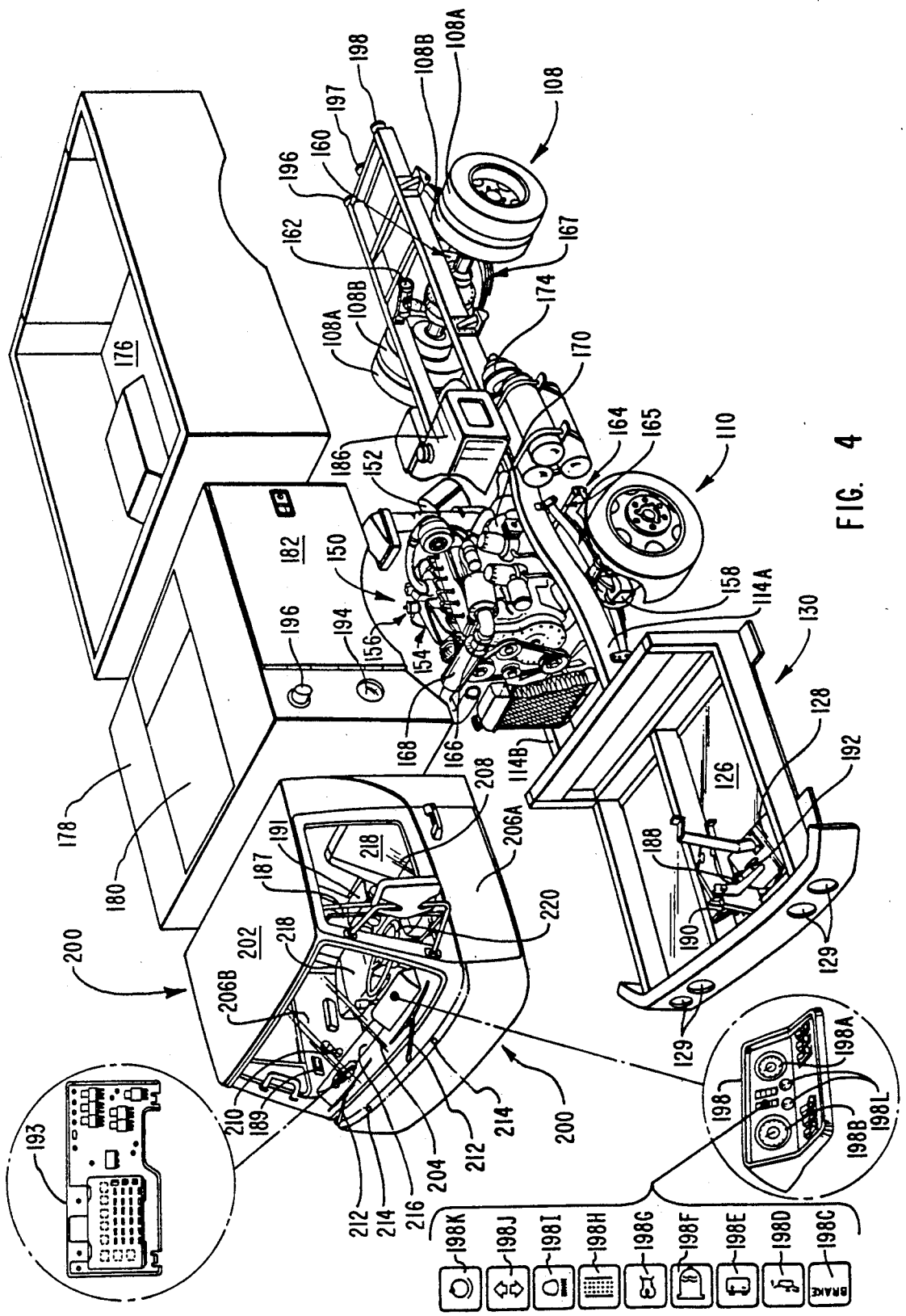
FIG. 4 is an exploded perspective view of the assemblies of the present invention which are to be installed on the low profile vehicle split level frame in accordance with the present invention.

Referring next to FIG. 4, the split level frame of the described embodiment is illustrated with frame extension 130 attached to frame rails 114A and 114B. The split level frame is much more economical to fabricate and less expensive and troublesome to maintain than articulating frames used in some prior art low profile vehicles. Frame extension 130 is ready to receive the modified cab shown suspended above the frame extension.

Floor plate 126 is shown attached to frame extension 130. Positioned within recess 128 formed on floor plate 130 are a clutch pedal 192, an accelerator pedal 190, and a brake pedal 188 which are each connected to their respective associated components by way of appropriate control lines as will be appreciated by those skilled in the art, and as will be explained later in this disclosure.

The embodiments of the present invention include an engine means for providing power to propel the vehicle. Illustrated in FIG. 4 is a diesel engine, generally designated at 150, and its associated components which is one presently preferred example of an engine means of the present invention. Diesel engine 150 is preferably the engine which is supplied with the preferred vehicle chassis.

Associated with engine 150 in the presently preferred embodiment are additional components which enhance the performance of the vehicle and which are generally unavailable on prior art low profile vehicles. Represented in FIG. 4 at 154 are dual fuel filters each having a heater to improve cold weather performance. Also represented in FIG. 4 is an automatic glow plug, represented at 156, which assists with cold weather starting.

The illustrated embodiment is also provided with an air intake pre-cleaner chamber 152 which is adapted to eliminate large particles present in the intake air. The presently preferred embodiment is also equipped with an intake airflow warning system, as represented by indicator 198H, to alert the operator of the vehicle of restricted air intake flow. It will be recognized that when operating the low profile vehicle in a mining operation the risk of particulates entering the engine or restricting the air flow therein is significant. Thus, the inclusion of intake airflow warning system indicator 198H and air intake pre-cleaner chamber 152 is a great advantage.

A brake means is included in the present invention. As used herein the brake means is defined as those structures which are adapted to brake the rotation of any of the wheels and any structure which perform functions equivalent thereto.

As an example of the brake means of the present invention, disc brakes are desirably provided on the front wheels as represented at 158 in FIG. 4. Moreover, as an additional safety feature, the brake actuation system of the illustrated embodiment comprises an air over hydraulic arrangement, represented at 174, which provides power assist (air) braking even if the engine is non-operational or should fail for some reason.

Low profile vehicles such as the illustrated embodiment place severe demands on the braking means incorporated therein. It is a common problem that the brake linings present in such vehicles unnoticeably wear out and cause significant damage to the brake drums or rotors. Thus, the illustrated embodiment is provided with a brake wear warning system, as indicated at brake warning indicator 198C in FIG. 4, which illuminates when a brake lining wears out. The brake wear warning system incorporates a conductor embedded in each of the brake linings which is broken when wear to a certain point occurs at which point brake warning indicator 198C is actuated.

Also represented in FIG. 4 is a rear axle proportioning valve 162 which functions to distribute braking action between the front brakes and the rear brakes depending upon the distribution of the load on the frame. An automatic exhaust brake 166 is also included in the illustrated embodiment as represented at 166 in FIG. 4. Exhaust brake 166 allows the operator to reduce the vehicle speed without application of the friction brakes to the wheels.

The presently preferred embodiment also includes other braking means components which serve to increase the reliability and safety of vehicle operation. For example the illustrated embodiment includes dual brake actuation circuits (front and rear) each with their own master cylinders, hydraulic fluid reservoirs, and fluid lines.

The illustrated embodiment is also provided with an exhaust particulate trap 168 which traps particulate material present in the engine exhaust. The ceramic element presently preferred for use in the exhaust particulate trap is one available from Engine Control Systems, Ltd. of Canada. Detailed instructions concerning its use are available from the manufacturer. Using the disclosure contained herein and the instructions provided by the manufacturer, one of skill in the art will be able to readily incorporate the same into embodiments of the present invention.

Also shown in FIG. 4 are front wheels 110 which are used to steer the vehicle in cooperation with a steering mechanism as represented at 164 and including a steering wheel indicated at 220. The preferred vehicle chassis identified earlier is available with several different manual or power steering mechanisms which may be incorporated into embodiments of the present invention. Advantageously, the front axle turning angle of the illustrated embodiment is in the range from about 44° to about 49°, and preferably about 48°, which provides a conveniently small turning radius.

The illustrated embodiment also includes a front and a rear suspension system, generally designated at 165 and 167, respectively, which each include a stabilizer bar and shock absorbers. The drive train of the illustrated embodiment includes a transmission, generally identified at 170, and a lockup rear differential, generally identified at 160. Transmission 170 is the presently preferred example of a transmission means of the present invention.

Lockup rear differential 160 is actuated by the positioning of a switch (not shown) provided within the cab. Lockup rear differential 160 is preferred over limited slip differentials which are more prone to wear. Lockup rear differential provides the advantage of having power applied to both rear wheels when traveling over loose road surfaces without the operator having to leave the cab.

In the illustrated embodiment, it is preferred that transmission 170 be a manual transmission with five forward gears which is available as provided equipment on the preferred vehicle chassis. Similarly, it is preferred that lock-up rear differential 160 be that which is provided equipment on the preferred vehicle chassis. Alternatively, other commercially available alternatives may be incorporated into the embodiments of the present invention.

Furthermore, in order to increase traction, wheels 110 and 108 have mounted thereon an appropriate off-road tire. For example, front wheels 110 preferably have oversize (e.g., ten to fourteen inch wide treadface) tires mounted thereon to reduce front wheel "ploughing" on unstable surfaces. The inclusion of the described components provides a low profile vehicle with superior performance in low profile applications and which may also be taken on public roads and highways at normal speeds when required.

Those having experience in the vehicular arts will appreciate that the described dual rear wheels (108A and 108B in FIG. 4), lockup rear differential 160, and transmission 170 allow the illustrated embodiment to achieve high levels of traction. Prior art low profile vehicles generally incorporate "all wheel drive" schemes, with their higher initial cost and maintenance expenses, to maximize traction. By utilizing the described drive train and associated components, the illustrated embodiment is able to achieve superior traction without the added expense and complexity of incorporating an all wheel drive scheme.

As mentioned, one of the primary drawbacks found in prior art low profile vehicles is the lack of suitable safety and comfort features for the operator of the vehicle who regularly spends long hours maneuvering the vehicle. Many of the prior art vehicles leave the operator exposed to the surrounding environment while providing only a steel cage to protect the operator from falling objects.

In contrast to the prior art, the embodiments of the present invention provide operator comfort and safety features which are generally unknown in the prior art. By retaining nearly all of the desirable features of the cab of the preferred vehicle chassis, the completed low profile vehicle provides safety and comfort features heretofore unknown in low profile vehicles.

Referring still to FIG. 4, the completed cab, generally designated 200 (having been cut down as represented in FIG. 3A), is illustrated above the position it will occupy when attached to frame extension 130. Represented in FIG. 4 is a curved windshield 204 which provides excellent visibility for the operator and which has been heretofore unavailable in low profile vehicles.

Also illustrated in FIG. 4 are windshield wipers 212 and washers 214. A padded dashboard 216 is included in the described embodiment of the present invention. The features of windshield wipers 212, windshield washers 214, and a padded dashboard 216 increase operator comfort and safe operation of the low profile vehicle.

The illustrated embodiment is provided with several other features which increase efficient and safe operation of the vehicle. As represented in FIG. 4, an instrument panel 198 is provided with a speedometer 198A, a tachometer 198B, and dual air pressure gauges 198L. In addition to these basic instruments, the below listed instruments, and their associated components, are also provided:

| Reference Number | Description |
|---|---|
| 198C | Brake warning indicator |
| 198D | Oil pressure indicator |
| 198E | Charging indicator |
| 198F | Fuel filter indicator |
| 198G | Automatic glow plug indicator |
| 198H | Air intake restriction indicator |
| 198I | High beam indicator |
| 198J | Turn signal indicator |
| 198K | Exhaust brake indicator |

Also represented in FIG. 4 is an electrical circuit assembly 193 containing electrical relays, fuses, and other electrical components. The electrical circuit assembly is mounted in the cab providing easy access and protection from dirt and other contaminants found in the surrounding environment.

A side illumination lamp, one of which is indicated in FIG. 4 at 194, is provided on each side of engine cover 178. The appropriate side illumination lamp 194 is configured to operate when a turn signal control mounted in the cab is actuated. Thus, as the illustrated vehicle maneuvers on dark mine roadways, the operator is able to see down dark roadways before turning the vehicle. Also illustrated in FIG. 4 are tail lights/turn signals 196. A backup light 197 is also provided.

The cab of the illustrated embodiment is provided with two entry doors identified as 206A and 206B in FIG. 4. As shown in FIG. 4, doors 206A and 206B are provided with a forward mounted release handle (one of which is shown at 189) which are easy to reach and operate. In contrast, prior art low profile vehicles are provided with crude door release mechanisms which are inconveniently mounted in back of the operator's seating position or in some other inconvenient location.

The entry doors are preferably those which are supplied with the preferred vehicle chassis and modified in accordance with the present invention. Each of entry doors 206A and 206B are provided with a vertically sliding widow 208 which is operable by a crank, one of which is represented at 210 in FIG. 4. Also provided are pivoting vent windows 187.

Entry doors 206A and 206B and vertically sliding windows 208 provide for easy access into and out of the cab and also allow the operator to determine the amount of exposure to the surrounding environment which is desirable. The cab is also provided with a heater 191 and two seats 218 which are commercially available.

FIG. 4 also shows an engine cover 178 which is ready to be secured to the split level frame over engine 150. Engine cover 178 functions to protect the engine and associated components from damage. Engine cover 178 includes a removable panel 180 to allow access to the top of the engine. A door 182 is provided on each side of the engine cover to allow access to the components contained therein after the cover is secured in place. Also provided on the engine cover is an exhaust port 196.

The techniques and materials necessary to incorporate the mentioned featured components into embodiments of the present invention are available to those dealing in the applicable arts, are available commercially, and/or are provided with one or more models of the preferred vehicle chassis.

It will be understood by those familiar to the applicable arts that the above described features are generally not found in prior art low profile vehicles even though they contribute greatly to the performance and the safe and efficient operation of the vehicle. Furthermore, the combination of several of the described features has been unavailable in any prior art low profile vehicle and provides the described embodiment even greater performance and safety.

Also illustrated in FIG. 4 is a general purpose utility body 176 which is one example of the body means of the present invention. Other examples of the body means which may be incorporated into embodiments of the present invention will be described later in connection with FIGS. 6-11. Advantageously, body 176 may be readily interchanged with other examples of bodies which function as the body means of the present invention.

Figure 4A:
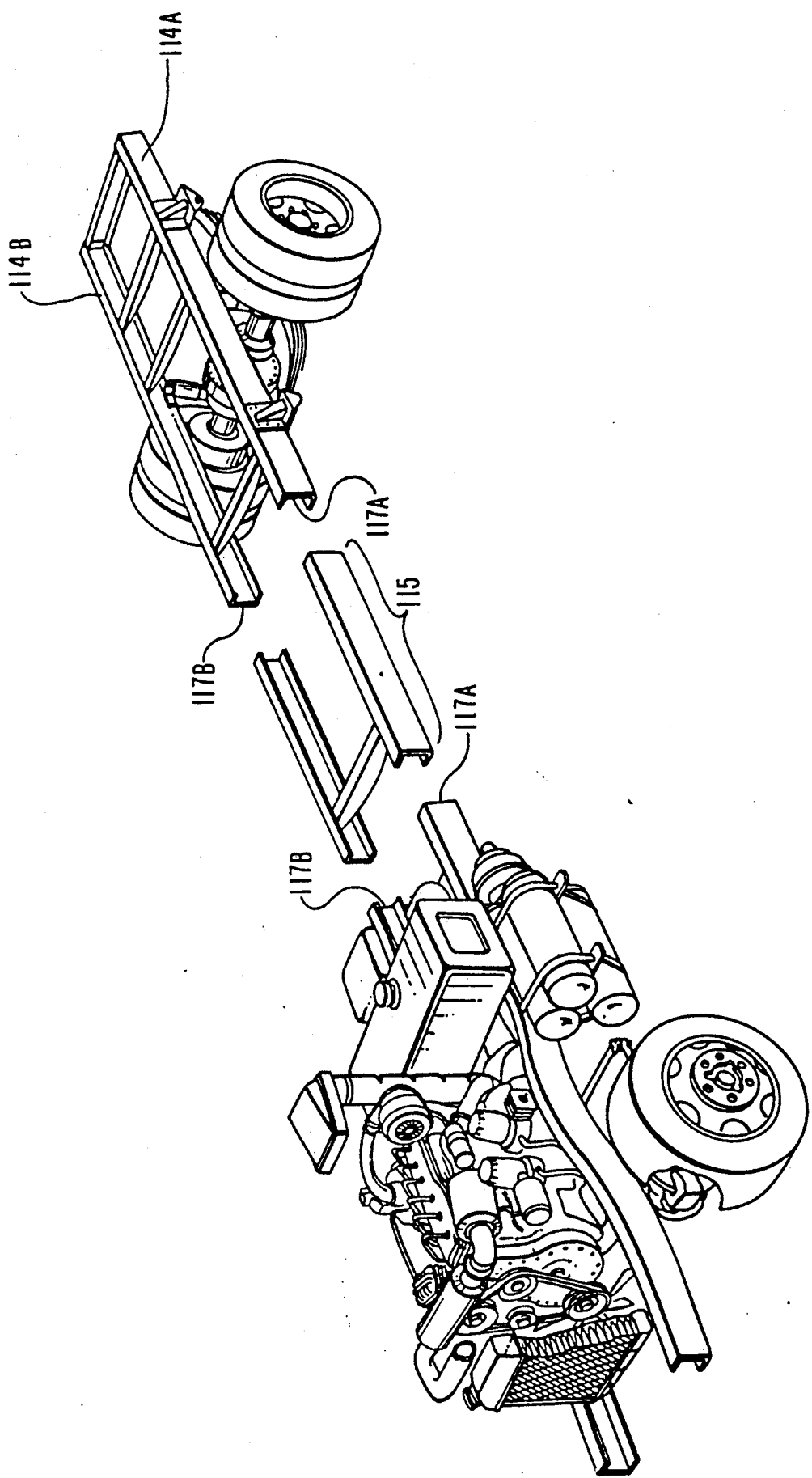
FIG. 4A is a perspective view of the frame of the illustrated embodiment undergoing the step of being shortened.

It is presently preferred that the frame of the preferred vehicle chassis be shortened to provide a shorter wheelbase. FIG. 4A illustrates the removal of a portion, indicated by bracket 115, of frame rails 114A and 114B, and reconnecting the remaining ends (117A and 117B) of the remaining frame rails, resulting in a shorter frame. It is preferred that the wheelbase of the completed low profile vehicle be in the range from about eighty to about one hundred fifty inches.

Figure 5:
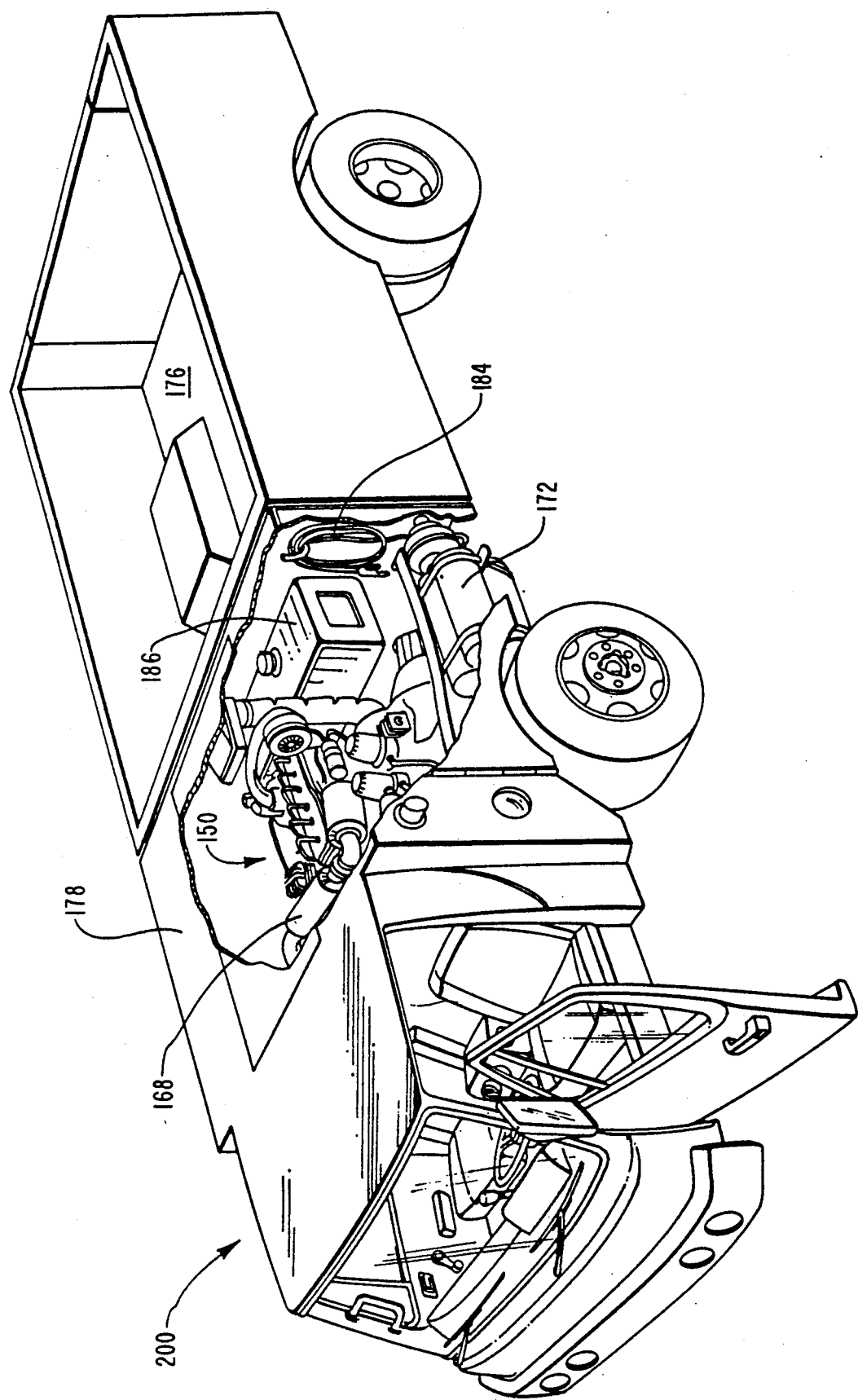
FIG. 5 is a partially cut away perspective view of the low profile vehicle illustrated in FIG. 1 showing additional components installed thereon.

Referring next to FIG. 5, a partial cut away perspective view of the completed presently preferred low profile vehicle is provided. Cab 200, engine housing 178, and body 176 are shown attached to the frame.

Represented in FIG. 5 is a fuel tank 186 positioned under the engine cover. Also positioned under the engine cover are air tanks 172 which supply air pressure for the brake system. An air hose 184 is also provided to facilitate the cleaning of the engine and other vehicle components with a stream of compressed air. Use of air hose 184 is particularly important in coal mining operations since coal dust layered on hot engine components may ignite.

As can be seen in FIG. 5, the completed low profile vehicle provides a spacious operators cab with numerous safety and comfort features. Advantageously, the spaciousness of the operators cab is retained while still maintaining a maximum vertical height of less than eighty inches, and preferably less than fifty-five inches. Moreover, the illustrated low profile vehicle may be built much more economically than prior art low profile vehicles not having the mentioned desirable features.

One of the great advantages of the present invention is that one low profile vehicle chassis may be used as a platform for many different bodies. Thus, an owner of a fleet of low profile vehicles manufactured according to the present invention can stock a single inventory of repair parts and is only required to deal with identical or very similar chassis all sharing identical parts. This is in contrast to the prior art scheme of designing and manufacturing a different chassis depending upon the end use of each low profile vehicle.

Figure 6:
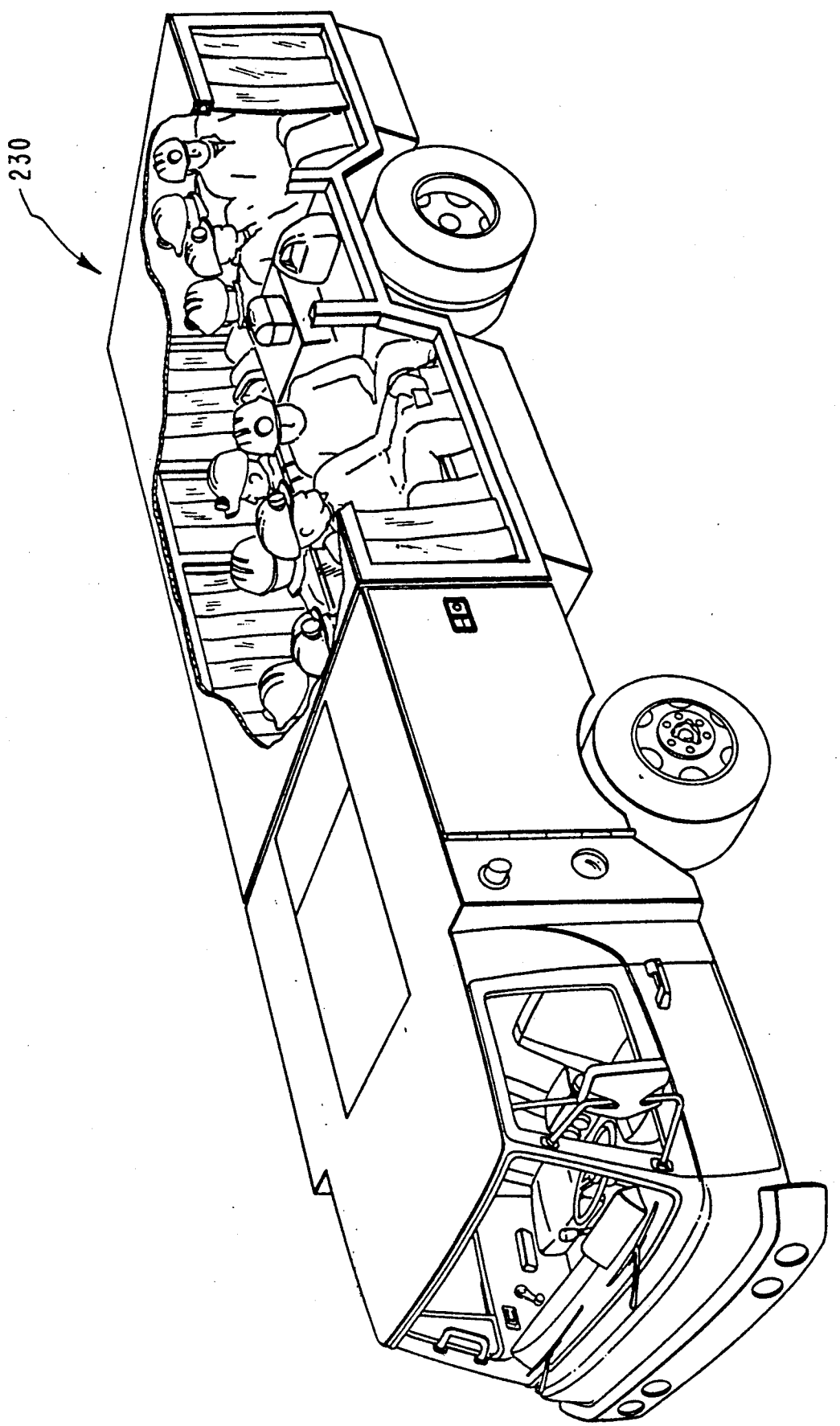
FIG. 6 is a partially cutaway perspective view of the low profile vehicle of the present invention with a personnel carrier body installed thereon.
Figure 7:
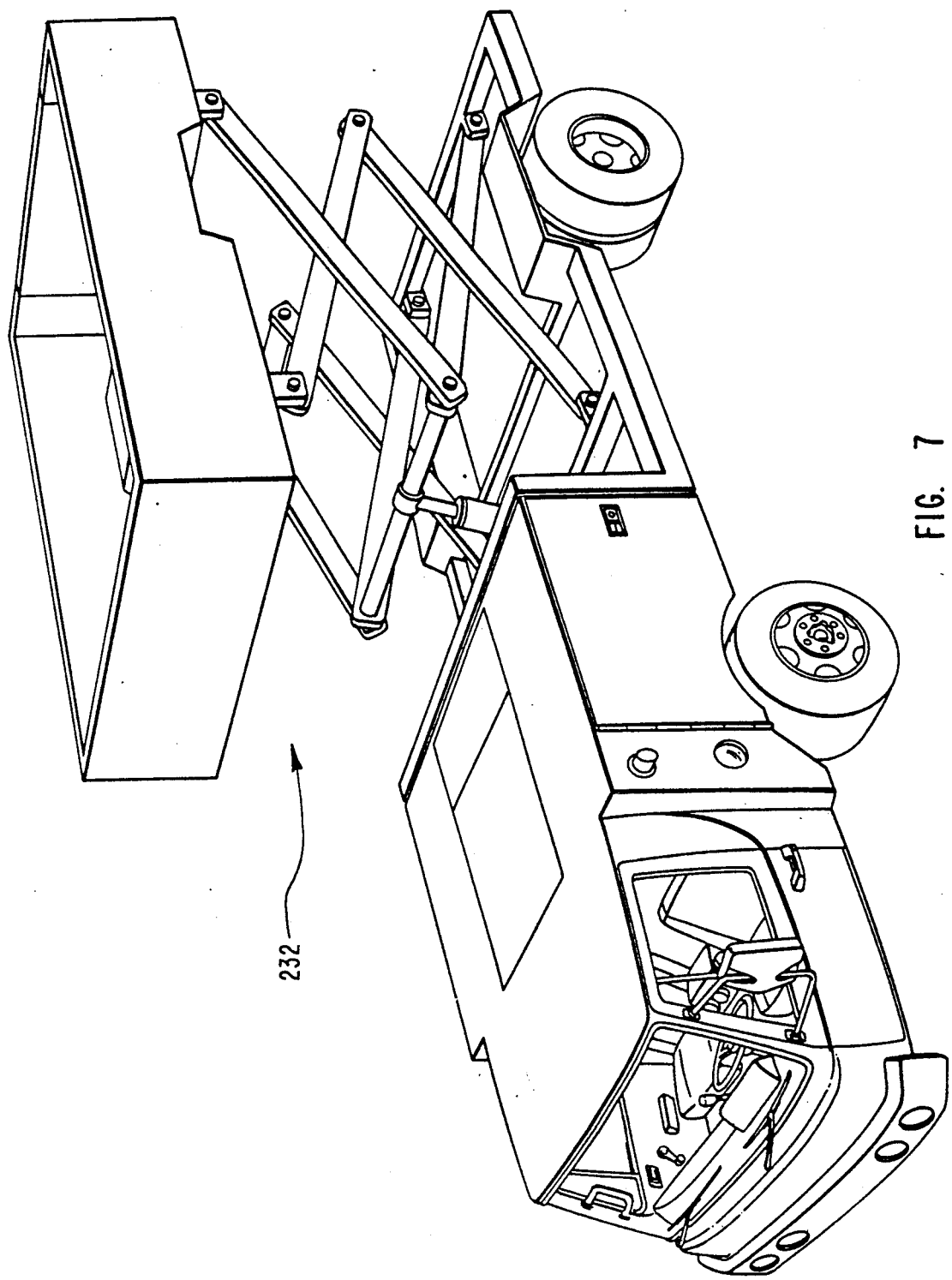
FIG. 7 is a perspective view of another low profile vehicle of the present invention with a telescopic scissor lift body installed thereon.

Referring next to FIG. 6, the low profile vehicle of the present invention is illustrated as having a personnel carrier body 230 attached to the frame. FIG. 7 shows the low profile vehicle of the present invention having a telescopic scissor-type lift body 232 mounted thereon. Suitable lifts are known and available in the art and may be readily incorporated into the present invention using the teachings contained herein.

Figure 8:
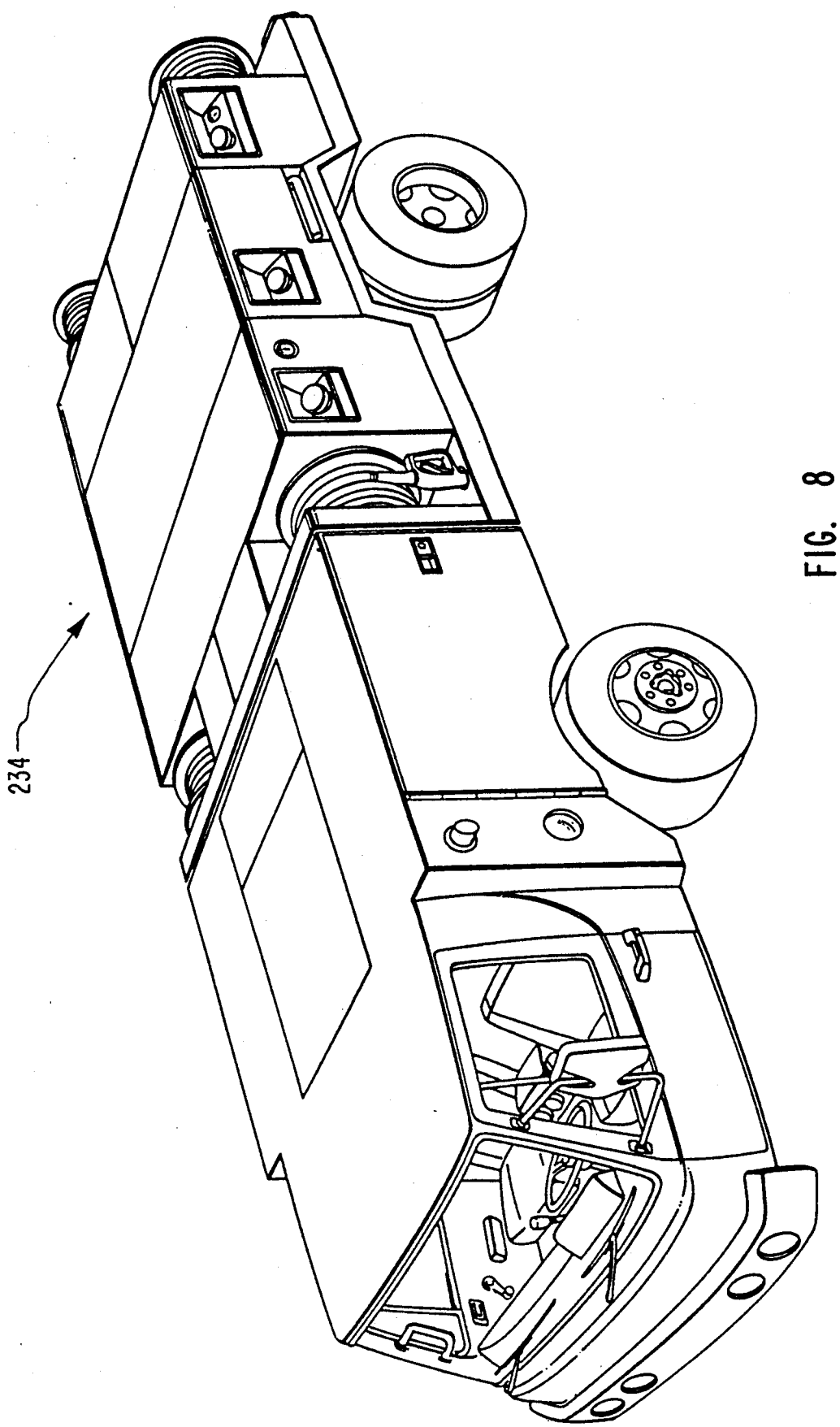
FIG. 8 is a perspective view of another low profile vehicle of the present invention with a fuel and lubrication body installed thereon.
Figure 9:
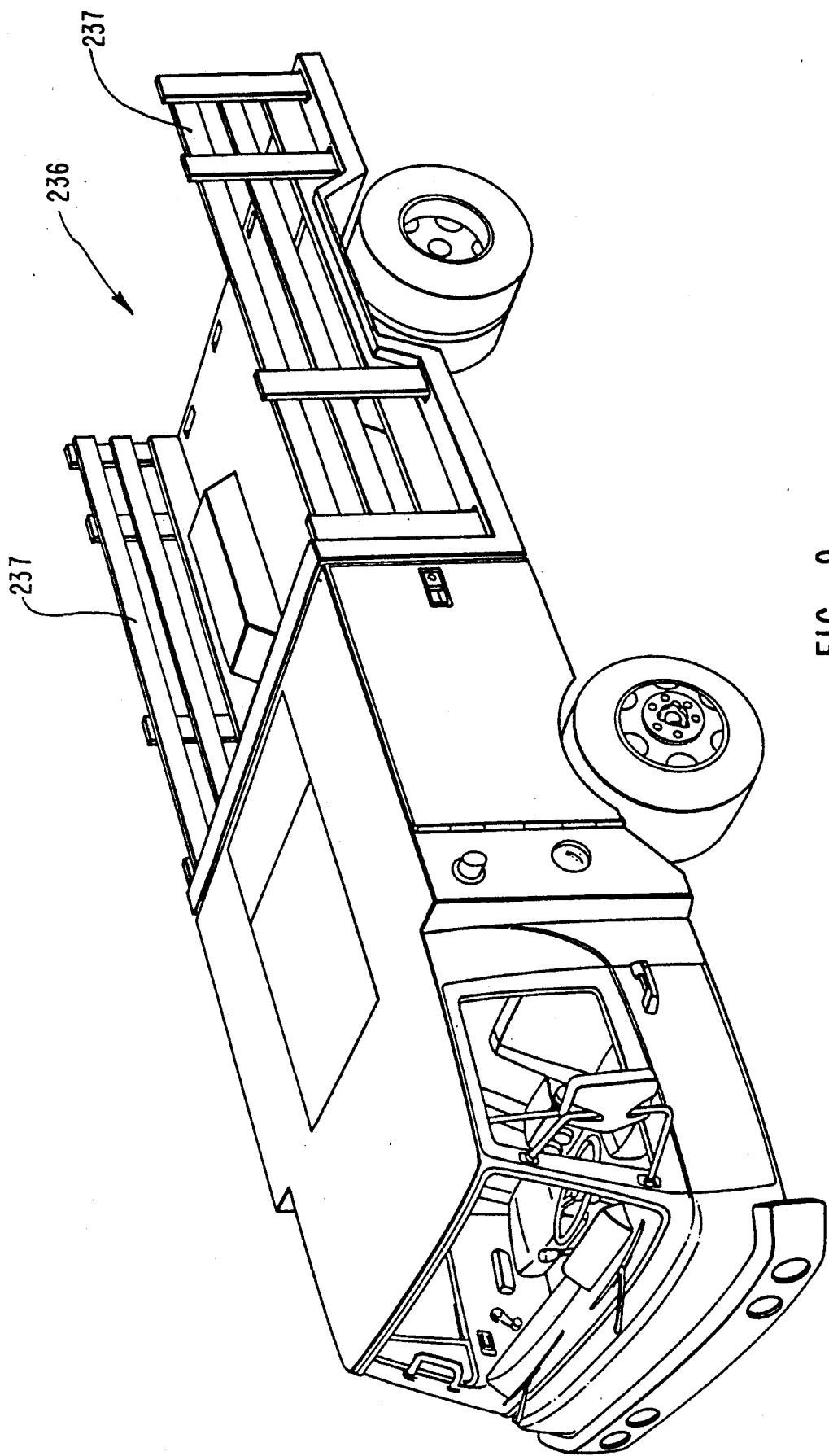
FIG. 9 is a perspective view of another low profile vehicle of the present invention with a stake bed utility body installed thereon.

The described low profile vehicle represented in FIG. 8 has a body including lubrication and fuel tanks 234 installed thereon. Still further, FIGS. 9 and 10 show the completed low profile vehicle with a stake bed utility body 236, with side rails 237, and a fresh water/waste water tank body 238, respectively, installed thereon.

Even further, FIG. 11 illustrates the completed low profile vehicle with a medical assistance and transport body 240 thereon. The medical assistance and transport body is provided with various equipment compartments and alcoves 242 for transporting stretchers therein. It will be appreciated that all of the described bodies, as well as other bodies, may function as the body means of the present invention.

2. Detailed Description of the Method of the Present Invention

Provided below in Groups A-J are the presently preferred steps used to fabricate the low profile vehicle described herein. It will be appreciated that the below listed steps are merely presently preferred and that other steps may be used in accordance with the present invention.

Using the steps listed below, and the teachings contained above, those of skill in the art will be able to make and use the embodiment described herein and other embodiments of the present invention. The contents of each of the below-listed groups are as follows:

| Group | Contents |
| --- | --- |
| A | Front Chassis Disassembly |
| B | Front Chassis Reassembly |
| C | Center Chassis Disassembly |
| D | Center Chassis Reassembly |
| E | Rear Chassis Disassembly |
| F | Rear Chassis Reassembly |
| G | Final Assembly |
| H | Cab Subassembly, Fabrication & Modification |
| I | Center Subcomponent Fabrication |
| J | Rear Subcomponent Fabrication |

GROUP A—FRONT CHASSIS DISASSEMBLY

1. REMOVE BATTERY BOX & CABLES

Remove the battery box assembly from the frame. Unbolt the negative battery cable from the frame and remove. Cut the positive cable at 36" from the battery end, and remove. Save all parts for reuse later.

2. REMOVE CAB GRILLE

Loosen the mounting screws on the grille hinges, and remove the radiator grille from the cab.

3. REMOVE LH/RH CAB DOORS

Remove the bolts securing the door hinges to the door framework, and remove both of the cab doors. Save the doors for modification and reuse later.

4. REMOVE FRONT WINDSHIELD

Cut the outer lip off of the windshield weatherstrip, and carefully remove the front windshield. Store for reuse later.

5. DRAIN RADIATOR COOLANT

Drain fluid from the radiator petcock into a 5 gallon bucket. Re-tighten the petcock, and save the fluid for reuse later.

6. DRAIN CLUTCH FLUID

Disconnect and remove the clutch flexible line under the cab, and cap the fitting under the cab. Remove the ¼" steel line on the LH frame, and cap the fitting ends. Drain the fluid into a bottle to be reused later.

7. DRAIN POWER STEERING FLUID

Drain the power steering fluid into a container for reuse later.

8. RELEASE AIR TANK PRESSURE

Release all of the air pressure in the system.

9. REMOVE PARKING BRAKE VALVE

Remove and modify the parking brake valve.

10. CUT HEADLAMP WIRING

Cut the headlamp wiring. Remove the headlamp assemblies.

11. COVER AIR INTAKE OPENING

Cover the air intake opening behind the RF wheel with a plastic or heavy cloth cover, and secure with tape.

12. REMOVE STEERING WHEEL ASSEMBLY

Remove the steering wheel assembly. Save all parts for reuse.

13. REMOVE SEATS FROM THE CAB

Remove the driver and passenger seats from the cab.

14. DISCONNECT ACCELERATOR CABLE

Disconnect the cable from the injection pump and the fixing bracket on the engine. Cut the cable off of the cab at the foot pedal and discard the cable.

15. CUT MAIN WIRING HARNESS

Cut and label both ends of each of the individual wires in the main and auxiliary wiring harnesses.

16. REMOVE CLUTCH & BRAKE PEDAL ASSEMBLY

Remove the pedal assembly from the cab.

17. REMOVE HEATER ASSEMBLY

Remove the heater assembly and control panel from the cab and save for modification and reuse later. Remove the defroster ducts leading to the RH & LH dash vents and save for reuse later

18. REMOVE GLOVE BOX ASSEMBLY

Remove the glove box assembly, and discard.

19. REMOVE WINDSHIELD FLUID RESERVOIR

Remove the windshield fluid reservoir with its upper mounting bracket, and save for reuse later.

20. REMOVE GEAR SHIFT LEVER ASSEMBLY

Remove the gear shift lever assembly from the cab. Loosely reassemble the upper and lower plates, and save for reuse later.

21. REMOVE THE CAB FROM THE FRAME

Remove the cab assembly.

22. REMOVE CAB TORSION BAR ASSEMBLY

Remove the torsion bar bases.

23. REMOVE FRONT BUMPER & FRAME TUBE

Unbolt the power steering valve and bracket from the front frame tube. Remove the front bumper and front frame tube.

24. REMOVE STEERING GEARBOX & LINK ROD

Disconnect all fluid lines to the gearbox, and seal with temporary caps. Remove the two fluid lines running from the gearbox to the fluid control valve in front of the radiator, and discard. Leave the "T" fitting and the shut-off valve in the 12 mm steel line fastened to the gearbox for reuse later. Disconnect the link rod on both ends using a spreader fork. Unbolt the gearbox from the frame. Remove the gearbox and the link rod and save for modification later.

25. REMOVE GEARBOX MOUNTING BRACKET

Remove the gearbox bracket.

26. REMOVE MISCELLANEOUS PARTS

Remove the lower radiator guard and save for modification and reuse later. Unbolt the oil dipstick and oil filler tube from the frame. Remove the oil filler tube for modification and reuse later. Remove the horn and mounting bracket from the frame, and save for reuse later.

27. REMOVE GEAR SHIFT LINK ROD

Unbolt the link rod and support bracket from the frame. Unbolt the stiffener rod from the transmission, and remove the link rod and front bracket from the frame. Save the stiffener and link rods for modification and reuse later. Place a new bolt in the top of the transmission in the hole previously used by the stiffener rod end.

28. REMOVE EXHAUST SYSTEM COMPONENTS

Unbolt and remove selected exhaust system components.

29. CUT FRONT FRAME

Mark and saw cut the front frame channels. Discard the cut off pieces of channel.

GROUP B—FRONT CHASSIS REASSEMBLY

1. MODIFY COOLANT FILLER BOTTLE

Lower the position of the coolant filler bottle.

2. MODIFY CAB TILT WARNING CIRCUIT

Disconnect and terminate the tilt cab wiring harness.

3. REPLACE FRONT WHEELS & TIRES

Lift up the front of the chassis and remove the front wheels and tires. Install the new 14.00×17.50 tires and wheels.

4. INSTALL AIR LINE FITTINGS

Cut square ends on each of the air lines located on the LH side of the radiator using a hand tubing cutter. Install new brass inserts, ferrules, and nuts on the six 12 mm plastic air lines and the two 8 mm plastic air lines.

5. CONNECT CAB ASSEMBLY TO CHASSIS

Weld the frame of the cab assembly to the front of the chassis frame.

6. INSTALL CLUTCH HYDRAULIC LINES

Install the ¼" clutch fluid lines.

7. CONNECT THROTTLE CABLE

Using a 7/16" drill bit, drill out the cable bracket hole at the injection pump to accommodate the new cable. Thread the throttle cable in front of the radiator, and through the RH frame channel to the injection pump. Connect the cable to the bracket and to the ball on the injection pump lever. Adjust the cable for full throttle operation using the adjustment nuts on both ends of the cable. Tighten all nuts in position.

8. RECONNECT ALL WIRING HARNESS

Connect the matching numbered ends of the harness wires to the ends of each of the extension wires located at the rear of the cab. After crimping each butt connector, insulate each wire end with shrink wrap, and then remove the wiring labels as each wire is connected. Insert each of the completed wires into the upper harness. Next connect the wires supplying the heater fan, the speedometer, the windshield washer pump, the parking brake control valve, the front headlamps, the horn; the cab dome light, and the side turning lights.

9. SECURE ALL ITEMS UNDER DASHBOARD

Disconnect and discard the wiring harnesses under the right and left sides of the dashboard which previously went to the radio and cab clearance lights, to the dome light switches in each door, and to the radio speakers in each door. Coil all other unused harnesses together, and secure under the dashboard using tie wraps to make sure that all harnesses are secure and out of the way of the operator's and passenger's feet locations, and out of the way of any moving parts which would damage the wiring. Make sure all hoses and harnesses are tie wrapped and out of the way of moving parts, or of foot positions.

10. INSTALL GEAR SHIFT LINK ROD

Install the gear shifter link rod through the back of the cab. Connect the rod to the shift lever, to the transmission. Install the stabilizer arm bracket to the transmission bell housing. Connect the stabilizer arm to the bracket and to the link rod. Adjust for proper shift lever centering and proper operation in all gears.

11. CONNECT BRAKE AND LOCKING AXLE AIR LINES

Connect the six 12 mm air lines and the two 8 mm air lines proceeding out of the back of the cab to the matching lines running down the LH frame channel. Be sure to follow the color code labels when reconnecting the ends of the lines together. Tighten all line nuts. Make sure that the lines are tie-wrapped clear of the gear shift link rod.

12. INSTALL STEERING COMPONENTS

Install the steering gearbox, pitman arm, drag link, fluid lines, and input shaft pieces.

13. INSTALL RADIATOR GUARD

Install the lower radiator guard on the back of the cab wall, using 12 mm×35 mm bolts, nuts, and locks. Be sure that the guard tabs are bent so that it does not touch the bottom of the gear shifter link rod.

GROUP C—CENTER CHASSIS DISASSEMBLY

1. REMOVE DRIVE LINES & CARRIER BEARING ASSEMBLY

Remove both drive lines and the carrier bearing assembly from the frame. Save the rear drive line for reuse. Discard the front drive line and carrier bearing.

2. REMOVE FUEL TANK & FUEL FILTER ASSEMBLIES

Remove the fuel tank and brackets from the frame. Then remove the fuel filter assembly from the frame. Save all parts for reuse later.

GROUP D—CENTER CHASSIS REASSEMBLY

1. SHORTEN CHASSIS WHEELBASE

Cut tie wraps and loosen brackets for all wiring, hoses and tubing in the area to be cut out of the frame. Shorten the chassis wheelbase to 100 inches.

2. REMOUNT PARKING BRAKE VALVE & SERVO CANISTER

Use the drilling template and remount the parking brake valve and servo canister.

3. REMOUNT MISCELLANEOUS PARTS

Remount the oil dipstick, the oil filler tube, the remote start switch, and the power steering valve on the chassis.

4. RECONNECT CHASSIS BRAKE LINE

Reconnect the brake line in the LH frame channel.

5. INSTALL AIR INTAKE SHIELD

Install the shield over the air intake pipe.

6. REMOUNT FUEL TANK

Modify and remount the fuel tank in its brackets on the engine cover.

7. REMOUNT DRIVE LINE

Install the modified rear drive line between the transmission and the rear axle. Tighten the flange bolts to 150 Ft./lbs.

8. INSTALL ENGINE COVER ASSEMBLY

Install the pre-assembled engine cover assembly over the engine, and weld in position to the chassis.

9. INSTALL EXHAUST SYSTEM

Install the exhaust system between the turbocharger and the tail pipe.

10. REMOUNT FUEL FILTER ASSEMBLY

Remount the fuel filter assembly and fuel lines on the inside of the engine cover.

11. REMOUNT GLOW PLUG BOX

Remount the glow plug relay box on the inside of the engine cover.

12. INSTALL SPLASH SHIELDS

Install the alternator and steering splash shields.

13. RECONNECT EXHAUST BRAKE LINE

Reconnect the air line supplying the exhaust brake.

14. RECONNECT FUEL TANK WIRING

Reconnect the fuel tank wiring harness.

GROUP E—REAR CHASSIS DISASSEMBLY

1. EXCHANGE REAR TIRES

Lift up the rear of the chassis, and remove the highway tires and wheels. Exchange the highway tires with off-road tires.

2. SHORTEN REAR CHASSIS

Remove the rear light bar and cut off the rear frame pieces.

GROUP F—REAR CHASSIS REASSEMBLY

1. INSTALL REAR BUMPER

Install the rear bumper and light bar.

2. INSTALL SPARE TIRE CARRIER

Install the spare tire carrier.

3. INSTALL BATTERY BOX

Install the battery box assembly.

4. CONNECT CHASSIS CABLES

Reconnect the RH and LH chassis cables.

5. INSTALL BACKUP ALARM

Install the backup alarm.

6. INSTALL REAR CARGO BODY ASSEMBLY

Install the cargo body on the truck chassis and secure in place.

GROUP G—FINAL ASSEMBLY

1. TOUCHUP PAINT CAB AND BODY
2. INSTALL VEHICLE LABELS
3. INSTALL SPARE TIRE

Install the spare tire and wheel in the spare tire carrier, and secure in place with the retaining rod.

4. INSTALL VEHICLE JACK

Install the vehicle jack on the mounting pins in the rear cargo body.

5. QUALITY ASSURANCE INSPECTION

GROUP H—CAB SUBASSEMBLY FABRICATION & MODIFICATION

1. FABRICATE PEDAL ASSEMBLY BRACKETS

Fabricate the front and rear support brackets for the pedal assembly.

2. MODIFY PEDAL BRACKET AND PEDAL ARMS

Modify the center pedal bracket, and the actuating arms for the clutch and the brake pedals.

3. FABRICATE THROTTLE CABLE

Fabricate the throttle cable assembly.

4. FABRICATE THROTTLE PEDAL & CABLE BRACKET

Fabricate a throttle pedal assembly and the front cable bracket.

5. FABRICATE CAB FRAME, FLOOR, & Z BAR

Fabricate the cab frame, floor panel, and Z bar.

6. FABRICATE FRONT BUMPER

Fabricate the front bumper.

7. ASSEMBLE CAB FRAME, FRONT BUMPER, AND FLOOR

Assemble the cab frame and front bumper. Then weld the floor onto the framework as shown.

8. INSTALL CLUTCH AND BRAKE PEDAL ASSEMBLY

Install the pedal assembly on the cab floor with the new front and rear mounting brackets.

9. INSTALL THROTTLE PEDAL, CABLE, AND BRACKET

Install the throttle pedal, bracket, and cable on the cab floor.

10. CUT CAB SECTION

Prepare then cut and remove the cab section to be reused.

11. MODIFY CAB

Mark and cut the cab firewall and dashboard and install 6 mm jack nuts in the door jambs for the lower door hinges.

12. FABRICATE CAB REAR WALL, ROOF, & ROOF SUPPORTS

Fabricate the cab rear wall, the roof panel, and the two roof supports.

13. POSITION CAB REAR WALL

Position the cab rear wall on the cab floor and frame, align in position, and tack in place.

14. POSITION CAB SECTION & ROOF

Prepare and position the cab section on the assembled cab floor and frame and check for proper door frame dimensions and tack in position. Next position and tack the cab roof in position.

15. WELD & TRIM CAB ASSEMBLY

Weld the cab section to the floor and framework. Weld the cab roof and rear wall to the cab section. Trim the excess off of the edges of the cab floor and the cab back wall, and finish grind all edges.

16. MODIFY STEERING WHEEL BRACKET & SHAFT

Drill out the steering wheel bracket holes, and modify the steering shaft.

17. INSTALL STEERING COMPONENTS

Weld the steering gearbox mounting plate on the torque tube behind the cab. Install the necessary steering components on the cab floor.

18. FABRICATE WIRING HARNESS DUCTS & TRIM COVER

Fabricate the plastic outer ducts for the wiring harnesses and the brake lines, using the two plastic defroster hoses. Next fabricate the metal cover for the plastic hoses also.

19. FABRICATE GEAR SHIFT MOUNTING BRACKET

Fabricate the mounting bracket for the gear shift lever, the parking brake control, and the locking rear axle control.

20. FABRICATE GEAR SHIFT LINK ROD

Fabricate the gear shift link rod, and stiffener rod bracket.

21. MODIFY GEAR SHIFT LEVER

Modify the gear shift lever.

22. INSTALL GEAR SHIFT LEVER & OTHER VALVES

Assemble the shift lever, the parking brake valve, and the locking rear axle valve on the control panel. Connect the fabricated air lines to the two air controls. Install the control panel assembly on the cab floor and weld in position. Feed all air lines out the rear cab opening.

23. REMOVE CIGARETTE LIGHTER ASSEMBLY

Unplug the wires on the back of the cigarette lighter unit. Unscrew the unit from the dash and discard it.

24. MODIFY HEATER ASSEMBLY

Modify the heater assembly to fit.

25. INSTALL HEATER ASSEMBLY

Install the heater assembly on the back wall of the cab. Cut approximately 7 inches off the end of the two heater hoses, and connect to the water ports on the heater assembly. Secure the hoses to the heater ports with hose clamps.

26. FABRICATE WIRING HARNESS SECTIONS

Fabricate all the wiring harness sections required to reconnect the chassis harness, the headlamps, the horn, the windshield washer pump, the heater fan, the speedometer wiring, and the horn.

27. INSTALL CAB BRAKE AND CLUTCH LINES

Install the four new 12 mm plastic air lines and connect to the brake pedal valve. Run the air lines through the lower plastic duct, and exit them out the back of the cab. Install the front clutch fluid line in the cab in its nylon brackets. Shorten the blue plastic fluid line between the clutch fluid reservoir and the clutch master cylinder by 2.5 inches, and reconnect it to the master cylinder port. Remove the clear plastic discharge hose on the brake pedal valve. Loosen the nut on the discharge port on the brake pedal valve, and rotate it until it points towards the front cab firewall, and re-tighten the bolt. Shorten the air discharge hose by 11 inches, reattach it to the discharge port, and run the hose through the hole in the front firewall. Shorten the clutch fluid reservoir drain hose by 16 inches, and run the hose through the same hole in the front firewall. Use a tie wrap to secure the two hoses together.

28. INSTALL CAB WIRING HARNESS SECTIONS

Connect the required wiring harness sections to the cables under the dashboard and run them in the center harness ducts to the rear of the cab. Be sure to retain a unique number label on each wire extended to the back of the cab, in order to ensure proper final cable connections to the harness wires at the rear of the cab which proceed to the chassis.

29. MODIFY CAB DOORS

Modify the LH & RH cab doors.

30. INSTALL CAB DOORS

Install the cab doors. Check for proper hinge operation, and for proper exterior panel alignment and edge gap.

31. INSTALL WINDSHIELD WASHER RESERVOIR

Mount the reservoir to the rear of the cab.

32. BODY PANEL WORK

Repair all body panel imperfections. Finish sand all repaired areas suitable for primer painting.

33. MASK AND PAPER CAB FOR PAINTING

Thoroughly clean all debris off out of the cab floor. Cover all non-paint items on the inside and outside of cab with masking tape and paper. Roll up the door windows and paper the inside and outside of the window moldings. Wipe down all metal surfaces for painting with Stoddard solvent and allow to dry. Wipe down all surfaces for painting with a tack cloth. Move the cab to the painting area.

34. PAINT CAB ASSEMBLY

Apply primer paint to all repaired surfaces and to all bare metal surfaces on the cab. Apply 2 finish coats of paint to all unmasked surfaces of the cab. Move the cab to the curing area.

35. CAB DETAILING

Remove all tape and paper from the cab. Clean up any over spray on any non-paint surfaces.

36. INSTALL SEATS & DOORS, DOOR TRIM, AND WINDSHIELD

Install the cab seats and the inside door panels and handles on the doors. Next cut to length and install the weatherstripping on the door frame edges on both door openings. Next install the front windshield.

37. INSTALL TIRE WRENCHES AND FIRE EXTINGUISHER

Install the tire wrenches on their bracket on the bracket next to the passenger seat.

38. MODIFY STEERING GEARBOX INPUT SHAFT

Cut a key way in the power steering gearbox input shaft, using a EDM machine.

39. FABRICATE STEERING COMPONENTS

Fabricate the rear angle gearbox bracket, the $\frac{3}{4}$ inch input shaft, and the $1\frac{1}{4}$ inch input shaft and install the same.

GROUP I—CENTER SUBCOMPONENT FABRICATION

1. FABRICATE EXHAUST TAIL PIPE

Fabricate the exhaust tail pipe.

2. FABRICATE AIR INTAKE SHIELD

Fabricate the air intake shield.

3. FABRICATE CLUTCH LINE

Fabricate the additional piece of $\frac{1}{4}$" steel line required for the two sections of clutch line.

4. FABRICATE PLASTIC AIR LINES

Fabricate the additional pieces of 12 mm and 8 mm plastic air line required for the foot brake, the parking brake, and the lockup differential air lines.

5. FABRICATE STEERING GEARBOX MOUNTING PLATE

Fabricate the $\frac{3}{4}$" thick steering gearbox mounting plate.

6. FABRICATE POWER STEERING LINES

Fabricate the two steel power steering lines which connect to the steering gearbox.

7. MODIFY STEERING LINK ROD, & PITMAN ARM

Modify the steering link rod, and the pitman arm.

8. MODIFY REAR DRIVE LINE

Shorten the rear drive line.

9. EXCHANGE FRONT & REAR TIRES

Install 8.00×17.5 traction tires on the rear 17.5 tires on two 10×17.5 front wheels. Inflate to 45 psi, and balance both front wheels.

10. FABRICATE EXHAUST MANIFOLD

Fabricate the exhaust manifold.

11. FABRICATE EXHAUST BRAKE FITTINGS

Fabricate the two pipe fittings with flanges which attach to each end of the exhaust brake valve.

12. FABRICATE ENGINE COVER ASSEMBLY

Fabricate the engine cover assembly.

13. FABRICATE ENGINE COVER DOORS

Fabricate the engine cover doors.

14. FABRICATE FRONT WHEELS

Fabricate the axle steel wheels.

15. MODIFY RADIATOR GUARD

Modify the lower radiator guard.

16. FABRICATE SPLASH SHIELDS

Fabricate the alternator and steering splash shields.

GROUP J—REAR SUBCOMPONENT FABRICATION

1. FABRICATE REAR BUMPER

Fabricate the rear bumper assembly.

2. FABRICATE REAR BOX ASSEMBLY

Fabricate the rear box assembly.

3. FABRICATE SPARE TIRE CARRIER

Fabricate the spare tire carrier.

4. FABRICATE FRAME BRACKETS

Fabricate the frame brackets used to shorten the frame channels.

5. FABRICATE WOOD BED SPACERS

Fabricate the oak bed spacers.

6. FABRICATE TAILGATE HARDWARE

Fabricate the tailgate hardware.

3. Conclusion

In view of the foregoing, it will be appreciated the present invention is a great advance in the arts pertaining to low profile vehicles. The present invention allows the desirable components and features of a normal profile vehicle to be incorporated into a low profile vehicle more economically than fabricating prior art low profile vehicles which do not include such desirable components and features. Moreover, the embodiments of the present invention perform better in many applications than prior art low profile vehicles because the components incorporated therein have been designed to work together rather than being a collection of unrelated components as are found incorporated into prior art low profile vehicles.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A low profile, self propelled utility vehicle for use where the vehicle must maneuver through low clearances, the vehicle comprising:

split level frame means for supporting vehicle components thereon, the split level frame means comprising a forward frame level and a rearward frame level, the forward frame level having a different vertical level than the rearward frame level, the forward frame level and the rearward frame level being substantially longitudinally offset from each other;

a pair of front wheels adapted for steering the vehicle;

means for steering the front wheels;

a pair of rear wheels adapted for propelling the vehicle;

engine means for providing power to propel the vehicle;

transmission means for transmitting power from the engine means to the pair of rear wheels; and cab means for supporting an operator of the vehicle from off the ground, said cab means being attached to the forward level of the split level frame, the cab means having a maximum vertical height of less than about eighty (80) inches allowing the vehicle to maneuver under low clearance objects.

2. A low profile, self propelled utility vehicle for use where the vehicle must maneuver through low clearances as defined in claim 1 wherein the steering means comprises a steering wheel located in the cab means and the steering wheel is oriented longitudinally to the frame means.

3. A low profile, self propelled utility vehicle for use where the vehicle must maneuver through low clearances as defined in claim 1 wherein the cab means is positioned forward of the pair of front wheels.

4. A low profile, self propelled utility vehicle for use where the vehicle must maneuver through low clearances as defined in claim 1 wherein the split level frame means comprises a split level rigid frame and wherein the forward frame level of the split level rigid frame means is lower than the rearward frame level of the split level rigid frame means.

5. A low profile, self propelled utility vehicle for use where the vehicle must maneuver through low clearances as defined in claim 1 wherein the pair of rear wheels each comprise dual wheels.

6. A low profile, self propelled utility vehicle for use where the vehicle must maneuver through low clearances as defined in claim 5 further comprising a lockup rear differential connected to the transmission means and to the pair of dual rear wheels.

7. A low profile, self propelled utility vehicle for use where the vehicle must maneuver through low clearances as defined in claim 1 wherein the engine means comprises a diesel engine.

8. A low profile, self propelled utility vehicle for use where the vehicle must maneuver through low clearances as defined in claim 7 wherein the engine means further comprises dual fuel filters each having a heating element and further comprising an automatic glow plug.

9. A low profile, self propelled utility vehicle for use where the vehicle must maneuver through low clearances as defined in claim 8 wherein the engine means comprises an air intake pre-cleaner chamber adapted to eliminate large particles present in the intake air and an intake airflow warning system adapted to warn the operator of restricted air intake flow.

10. A low profile, self propelled utility vehicle for use where the vehicle must maneuver through low clearances as defined in claim 9 wherein the engine means comprises an exhaust particulate trap.

11. A low profile, self propelled utility vehicle for use where the vehicle must maneuver through low clearances as defined in claim 1 further comprising disc brake means for braking the front wheels.

12. A low profile, self propelled utility vehicle for use where the vehicle must maneuver through low clearances as defined in claim 11 further comprising air over hydraulic brake means for allowing an operator to control the application of the disc brake means.

13. A low profile, self propelled utility vehicle use where the vehicle must maneuver through low clearances as defined in claim 12 further comprising rear brake means and a rear axle proportioning valve means for distributing braking action between the front disc brake means and the rear brake means depending upon the distribution of the load on the split level frame means.

14. A low profile, self propelled utility vehicle for use where the vehicle must maneuver through low clearances as defined in claim 12 further comprising means for indicating brake lining wear.

15. A low profile, self propelled utility vehicle for use where the vehicle must maneuver through low clearances as defined in claim 1 further comprising a front suspension means and a rear suspension means each comprising at least one stabilizer bar and a pair of shock absorbers.

16. A low profile, self propelled utility vehicle for use where the vehicle must maneuver through low clearances as defined in claim 1 further comprising exhaust brake means for reducing vehicle speed.

17. A low profile, self propelled utility vehicle for use where the vehicle must maneuver through low clearances as defined in claim 1 wherein the cab means comprises an enclosed operator's cab and a curved windshield.

18. A low profile, self propelled utility vehicle for use where the vehicle must maneuver through low clearances as defined in claim 17 wherein the cab means further comprises:

a curved front wall;

two entry doors;

a pivotally openable vent window; and a forward mounted door release provided on each of the two entry doors.

19. A low profile, self propelled utility vehicle for use where the vehicle must maneuver through low clearances as defined in claim 17 wherein the cab means comprises two entry doors, each of the entry doors comprising a crank operated, vertically sliding window.

20. A low profile, self propelled utility vehicle for use where the vehicle must maneuver through low clearances as defined in claim 19 wherein the cab means further comprises a padded dashboard and instrument panel.

21. A low profile, self propelled utility vehicle for use where the vehicle must maneuver through low clearances as a protective roof plate.

22. A low profile, self propelled utility vehicle for use where the vehicle must maneuver through low clearances as defined in claim 1 wherein the transmission means comprises five forward gears.

23. A low profile, self propelled utility vehicle for use where the vehicle must maneuver through low clearances as defined in claim 1 wherein the maximum vertical height is about sixty (60) inches.

24. A low profile, self propelled utility vehicle for use where the vehicle must maneuver through low clearances as defined in claim 1 wherein the maximum vertical height is about fifty-five (55) inches.

25. A low profile, self propelled utility vehicle for use where the vehicle must maneuver through low clearances as defined in claim 1 wherein the distance between centerline of the front axle and the centerline of the rear axle is in the range from about eighty (80) inches to about one-hundred and fifty (150) inches.

26. A low profile, self propelled utility vehicle for use where the vehicle must maneuver through low clearances as defined in claim 1 wherein the steering means is further for turning the front wheels to a turning angle in the range from about 44° to about 49°.

27. A low profile, self propelled utility vehicle for use where the vehicle must maneuver through low clearances as defined in claim 1 wherein the minimum ground clearance of the vehicle is about ten (10) inches.

28. A low profile, self propelled utility vehicle for use where the vehicle must maneuver through low clearances as defined in claim 1 further comprising body means for holding things to be transported, said body means being attached to the frame means.

29. A low profile, self propelled utility vehicle for use where the vehicle must maneuver through low clearances as defined in claim 28 wherein the body means comprises fuel supply and lubrication supply tanks.

30. A low profile, self propelled utility vehicle for use where the vehicle must maneuver through low clearances as defined in claim 28 wherein the body means comprises a personnel transporter.

31. A low profile, self propelled utility vehicle for use where the vehicle must maneuver through low clearances as defined in claim 28 wherein the body means comprises a stake bed.

32. A low profile, self propelled utility vehicle for use where the vehicle must maneuver through low clearances as defined in claim 28 wherein the body means comprises a lift apparatus.

33. A low profile vehicle adapted for maneuvering below ground on mining roadways and transporting a variety of things therein, the vehicle comprising:
  split level frame means for supporting vehicle components thereon, the split level frame means comprising a forward frame level and a rearward frame upper level;
  a pair of front wheels adapted for steering the vehicle, the forward level of the split level frame positioned forward of the pair of front wheels;
  means for steering the front wheels comprising a steering wheel;
  at least a pair of rear wheels adapted for propelling the vehicle;
  brake means for braking the pair of front wheels and the pair of rear wheels;
  an internal combustion engine adapted for providing power to propel the vehicle;
  body means for holding things to be transported, said body means attached to the split level frame, said body means being removable from the split level frame and replaced with another body means; and
  a cab adapted for enclosing and protecting an operator of the vehicle, said cab being attached to the forward lower level of the split level frame, the cab and the body means each having a maximum vertical height of about sixty (60) inches allowing the vehicle to maneuver in low clearance mine roadways.

34. A low profile vehicle adapted for maneuvering below ground on mining roadways and transporting a variety of things therein as defined in claim 33 wherein the steering wheel is oriented longitudinally to the split level frame.

35. A low profile vehicle adapted for maneuvering below ground on mining roadways and transporting a variety of things therein as defined in claim 33 wherein the split level frame comprises a split level rigid frame and wherein the forward frame level of the split level rigid frame is at least six (6) inches lower than the rearward level of the split rigid level frame.

36. A low profile vehicle adapted for maneuvering below ground on mining roadways and transporting a variety of things each comprise dual wheels and wherein the drive train comprises a lockup rear differential.

37. A low profile vehicle adapted for maneuvering below ground on mining roadways and transporting a variety of things therein as defined in claim 33 wherein the engine comprises:
  dual fuel filters each having a heating element;
  an automatic glow plug;
  an air intake pre-cleaner chamber adapted eliminate large particles present in the intake air;
  an intake air flow warning system adapted to warn the operator of restricted air intake flow;
  an exhaust particulate trap;
  a pair of side illumination lamps; and
  a hose connected to a supply of compressed air.

38. A low profile vehicle adapted for maneuvering below ground on mining roadways and transporting a variety of things therein as defined in claim 33 wherein the brake means further comprises:
  disc brakes provided on at least the pair of front wheels; and
  air over hydraulic brake actuation means for allowing an operator to control the application of the disc brake means.

39. A low profile vehicle adapted for maneuvering below ground on mining roadways and transporting a variety of things therein as defined in claim 38 further comprising a rear axle proportioning valve adapted for distributing braking action between the front disc brakes and rear axle brakes depending upon the distribution of the load on the frame.

40. A low profile vehicle adapted for maneuvering below ground on mining roadways and transporting a variety of things therein as defined in claim 33 further comprising a front suspension means and a rear suspension means each comprising at least one stabilizer bar and at least one shock absorber.

41. A low profile vehicle adapted for maneuvering below ground on mining roadways and transporting a variety of things therein as defined in claim 33 wherein the cab comprises a curved windshield.

42. A low profile vehicle adapted for maneuvering below ground on mining roadways and transporting a variety of things therein as defined in claim 41 wherein the cab further comprises:
  two entry doors, each of the entry doors comprising a crank operated, vertically sliding window;
  a padded dashboard;
  a brake warning indicator;
  a side illumination lamp; and
  a heater.

43. A low profile vehicle adapted for maneuvering below ground on mining roadways and transporting a variety of things therein as defined in claim 42 wherein the cab further comprises a protective roof plate.

44. A low profile vehicle adapted for maneuvering below ground on mining roadways and transporting a variety of things therein as defined in claim 33 wherein the maximum vertical height is about fifty-five (55) inches.

45. A low profile vehicle adapted for maneuvering below ground on mining roadways and transporting a variety of things therein as defined in claim 33 wherein the distance between the centerline of the front axle and the centerline of the rear axle is in the range from about eighty (80) inches to about one-hundred and fifty (150) inches.

46. A low profile vehicle adapted for maneuvering below ground on mining roadways and transporting a variety of things therein as defined in claim 45 wherein the means for steering is further for turning the front wheels to a turning angle in the range from 44° to about 49°.

47. A low profile vehicle adapted for maneuvering below ground on mining roadways and transporting a variety of things therein as defined in claim 45 wherein the minimum ground clearance of the vehicle is about ten (10) inches.

48. A low profile vehicle adapted for maneuvering below ground on mining roadways and transporting a variety of things therein as defined in claim 33 wherein the body means comprises a medical assistance and transport body.

49. A low profile vehicle adapted for maneuvering below ground on mining roadways and transporting a variety of things therein as defined in claim 33 wherein the body means comprises a personnel transporter.

50. A low profile vehicle adapted for maneuvering below ground on mining roadways and transporting a variety of things therein as defined in claim 33 wherein the body means comprises a water tank.

51. A method of fabricating a low profile vehicle adapted for operating under low clearances, the method comprising the steps of:
   providing an operator's cab;
   providing a normal profile vehicle frame, the vehicle frame being rigid and having front and rear wheel attachment points;
   attaching a frame extension to the frame forward of the front wheel attachment point to provide a support surface and such that the support surface is lower than the vehicle frame;
   modifying the cab such that the combined height of the cab and the height of the frame extension above the ground does not exceed the maximum vertical height allowed for the low profile vehicle;
   attaching the cab to the frame extension; and
   connecting control lines between operating controls provided in the cab and the vehicle components allow an operator to maneuver the low profile vehicle under low clearances from within the cab.

52. A method of fabricating a low profile vehicle adapted for operating under low clearances as defined in claim 51 wherein the cab comprises a windshield, and seats and wherein the step of modifying the cab comprises the steps of:
   removing the windshield;
   removing the doors; and
   removing the seats.

53. A method of fabricating a low profile vehicle adapted for operating under low clearances as defined in claim 51 wherein the cab comprises two doors, and front, back, and side walls, and wherein the step of modifying the cab comprises the steps of:
   shortening the doors; and
   shortening the cab front wall and side walls.

54. A method of fabricating a low profile vehicle adapted for operating under low clearances as defined in claim 51 further comprising the steps of:
   installing a cab roof with a substantially flat metallic plate; and
   installing a cab floor with a substantially flat metallic plate.

55. A method of fabricating a low profile vehicle adapted for operating under low clearances as defined in claim 51 further comprising the steps of:
   removing a portion from the length of the frame; and
   rejoining the resulting portions of the frame to produce a shorter frame.

56. A method of fabricating a low profile vehicle adapted for operating under low clearances as defined in claim 51 wherein the step of attaching the cab to the frame extension comprises the step of attaching the cab to the frame such that the maximum vertical height of the cab attached to the frame extension does not exceed about fifty-five (55) inches.

57. A method of fabricating a low profile vehicle adapted for operating under low clearances as defined in claim 51 further comprising the step of installing a body on the frame.

58. A method of fabricating a low profile vehicle adapted for operating under low clearances as defined in claim 51 further comprising the step of installing a personnel carrier body on the frame.

59. A method of fabricating a low profile vehicle adapted for operating under low clearances as defined in claim 51 further comprising the step of installing a fuel and lubrication supply body on the frame.

60. A method of converting a mass produced, normal profile vehicle comprising a frame, a pair of forward wheels and a pair of rear wheels, an operator's cab, a plurality of control lines between the operator's cab and components on the vehicle, the conversion resulting in a low profile utility vehicle, the method comprising the steps of:
   disconnecting the control lines between the cab and the components on the vehicle;
   removing the cab from the frame;
   cutting the cab down to less than its original height to produce a modified cab;
   attaching a frame extension forward of the front wheels to form a split level frame;
   attaching the modified cab to the frame extension such that the maximum vertical height of the cab attached to the frame extension is less than about eighty (80) inches; and
   reconnecting the control lines between the cab and the vehicle components such that an operator in the cab can maneuver the low profile vehicle in areas of low clearance.

61. A method of converting a mass produced utility vehicle to a low profile utility vehicle as defined in claim 60 wherein mass produced utility vehicle comprises a steering wheel assembly, an accelerator cable, a clutch pedal assembly, a brake pedal assembly, and a gear shift link rod, and wherein the step of disconnecting comprises the steps of:
   removing the steering wheel assembly;
   disconnecting the accelerator cable;
   removing the clutch pedal assembly;

removing the brake pedal assembly; and
removing the gear shift link rod.

62. A method of converting a mass produced utility vehicle to a low profile utility vehicle as defined in claim 60 wherein the mass produced vehicle comprises a windshield, seats and a bumper and wherein the step of cutting the cab down comprises the steps of:
   removing the windshield;
   removing the doors;
   removing the seats; and
   removing the front bumper.

63. A method of converting a mass produced utility vehicle to a low profile utility vehicle as defined in claim 60 wherein the cab comprises a front, back and side walls, and wherein the step of cutting down the cab comprises the steps of:
   shortening the doors;
   shortening the cab front wall and side walls; and
   providing a curved windshield.

64. A method of converting a mass produced utility vehicle to a low profile utility vehicle as defined in claim 63 wherein the step of cutting down the cab further comprises the steps of:
   replacing the cab roof with a substantially flat metallic plate; and
   replacing the cab floor with a substantially flat metallic plate.

65. A method of converting a mass produced utility vehicle to a low profile utility vehicle as defined in claim 60 further comprising the step of orienting a steering wheel longitudinally with the frame of the vehicle.

66. A method of converting a mass produced utility vehicle to a low profile utility vehicle as defined in claim 60 further wherein the mass produced normal profile vehicle comprises a diesel engine and wherein the method further comprises the steps of:
   providing dual fuel filters each having a heating element;
   providing an automatic glow plug;
   providing an air intake pre-cleaner chamber;
   providing an exhaust particulate trap; and
   providing an exhaust brake.

67. A method of converting a mass produced utility vehicle to a low profile utility vehicle as defined in claim 60 further comprising the step of providing a lockup rear differential and dual rear wheels.

68. A method of converting a mass produced utility vehicle to a low profile utility vehicle as defined in claim 60 further comprising the steps of:
   providing disc brakes on a pair of wheels; and
   providing an air over hydraulic brake actuation system.

69. A method of converting a mass produced utility vehicle to a low profile utility vehicle as defined in claim 60 further comprising the steps of:
   removing a portion from the length of the frame; and
   rejoining the resulting portion of the frame to produce a shorter frame.

70. A method of converting a mass produced utility vehicle to a low profile utility vehicle as defined in claim 60 wherein the step of attaching the modified cab to the frame extension comprises the step of attaching the modified cab to the frame such that the maximum vertical height of the cab attached to the frame extension is about fifty-five (55) inches.

71. A method of converting a mass produced utility vehicle to a low profile utility vehicle as defined in claim 60 further comprising the step of installing a body on the frame.

72. A method of converting a mass produced utility vehicle to a low profile utility vehicle as defined in claim 71 wherein the step of installing a body on the frame comprises the step of installing a personnel carrier body on the frame.

73. A method of converting a mass produced utility vehicle to a low profile utility vehicle as defined in claim 71 wherein the step of installing a body on the frame comprises the step of installing a fuel and lubrication supply body on the frame.

74. A method of converting a mass produced utility vehicle to a low profile utility vehicle as defined in claim 71 wherein the step of installing a body on the frame comprises the step of installing a scissor lift body on the frame.

75. A method of converting a mass produced utility vehicle to a low profile utility vehicle as defined in claim 71 wherein the step of installing a body on the frame comprises the step of installing a water tank body on the frame.

76. A method of converting a mass produced utility vehicle to a low profile utility vehicle as defined in claim 60 further comprising the step of replacing the tires.

* * * * *